US012750203B2

(12) United States Patent
Meghji

(10) Patent No.: US 12,750,203 B2
(45) **Date of Patent: *Sep. 29, 2026**

(54) SYSTEMS AND METHODS FOR SECURING ACCESS RIGHTS TO RESOURCES USING CRYPTOGRAPHY AND THE BLOCKCHAIN

(71) Applicant: Live Nation Entertainment, Inc., Beverly Hills, CA (US)

(72) Inventor: Adam Meghji, Toronto (CA)

(73) Assignee: Live Nation Entertainment, Inc., Beverly Hills, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 19/005,993

(22) Filed: Dec. 30, 2024

(65) Prior Publication Data

US 2025/0219808 A1 Jul. 3, 2025

Related U.S. Application Data

(63) Continuation of application No. 17/862,187, filed on Jul. 11, 2022, now Pat. No. 12,184,753, which is a (Continued)

(51) Int. Cl.

*H04L 29/06* (2006.01)
*H04L 9/00* (2022.01)

(Continued)

(52) U.S. Cl.

CPC ............ *H04L 9/007* (2013.01); *H04L 9/0643* (2013.01); *H04L 9/0825* (2013.01); *H04L 9/088* (2013.01);

(Continued)

(58) Field of Classification Search

CPC ..... H04L 9/007; H04L 9/0643; H04L 9/0825; H04L 9/088; H04L 9/0894; H04L 9/3247;

(Continued)

(56) References Cited

U.S. PATENT DOCUMENTS

| | | | | |
|---|---|---|---|---|
| 8,726,034 | B2 * | 5/2014 | Papamanthou | G06F 16/2246 713/189 |
| 8,908,686 | B1 * | 12/2014 | Ghosh | H04L 47/32 370/390 |

(Continued)

FOREIGN PATENT DOCUMENTS

| | | | | | |
|---|---|---|---|---|---|
| CN | 109039639 | A | * 12/2018 | | H04L 9/14 |
| CN | 109347632 | A | * 2/2019 | | H04L 9/30 |
| JP | 2020077256 | A | * 5/2020 | | G06F 21/64 |
| KR | 101674643 | B1 | * 11/2016 | | H04L 9/0891 |

*Primary Examiner* — Sher A Khan

(74) *Attorney, Agent, or Firm* — MUGHAL GAUDRY & FRANKLIN PC

(57) ABSTRACT

The present disclosure generally relates to securing access to resource and access rights using cryptography and the blockchain. Certain embodiments of the present disclosure generally relate to systems and methods that enhance the security of resource access using hierarchical deterministic (HD) cryptography and the blockchain. Certain embodiments of the present disclosure relate to systems and methods that securely and anonymously represent the identity of a user and the user's access code data on a distributed ledger represented across the blockchain.

19 Claims, 17 Drawing Sheets

1400

Related U.S. Application Data continuation of application No. 17/030,079, filed on Sep. 23, 2020, now Pat. No. 11,387,978.

(60) Provisional application No. 62/904,357, filed on Sep. 23, 2019.

(51) Int. Cl.

| | |
|---|---|
| ***H04L 9/06*** | (2006.01) |
| ***H04L 9/08*** | (2006.01) |
| ***H04L 9/32*** | (2006.01) |

(52) U.S. Cl.

CPC .......... *H04L 9/0894* (2013.01); *H04L 9/3247* (2013.01); *H04L 9/50* (2022.05)

(58) Field of Classification Search

CPC ..... H04L 9/50; H04L 9/3297; H04L 2209/42; H04L 9/3239; H04L 63/0407; H04L 63/101; G06F 21/6218; G06F 21/64

See application file for complete search history.

(56) References Cited

U.S. PATENT DOCUMENTS

| | | | | |
|---|---|---|---|---|
| 2002/0066016 | A1* | 5/2002 | Riordan | G06F 21/445 713/170 |
| 2003/0187999 | A1* | 10/2003 | Callum | H04L 69/329 709/229 |
| 2005/0138398 | A1* | 6/2005 | Hansen | G06F 21/6245 713/189 |
| 2007/0124578 | A1* | 5/2007 | Paya | H04L 9/3073 713/168 |
| 2015/0356523 | A1* | 12/2015 | Madden | G06Q 20/383 705/76 |
| 2016/0294555 | A1* | 10/2016 | Jakobsson | H04L 9/0836 |
| 2019/0123897 | A1* | 4/2019 | Adams | H04L 9/0894 |
| 2019/0253256 | A1* | 8/2019 | Saab | G06Q 20/3823 |
| 2019/0319808 | A1* | 10/2019 | Fallah | H04L 9/3239 |
| 2019/0325408 | A1* | 10/2019 | Goroff | G06Q 20/3825 |
| 2019/0355059 | A1* | 11/2019 | Liberman | G06Q 40/04 |

* cited by examiner

1400

1500

SYSTEMS AND METHODS FOR SECURING ACCESS RIGHTS TO RESOURCES USING CRYPTOGRAPHY AND THE BLOCKCHAIN

PRIORITY

This application is a continuation of U.S. patent application Ser. No. 17/862,187, filed Jul. 11, 2022, now U.S. Pat. No. 12,184,753, issued Dec. 31, 2024, which is a continuation of U.S. patent application Ser. No. 17/030,079, filed Sep. 23, 2020, now U.S. Pat. No. 11,387,978, issued Jul. 12, 2022, which claims the priority benefit of U.S. Provisional Application No. 62/904,357, filed Sep. 23, 2019, the disclosures of which are hereby incorporated by reference in their entirety for all purposes.

TECHNICAL FIELD

The present disclosure generally relates to securing access to resource and access rights using cryptography and the blockchain. Certain embodiments of the present disclosure generally relate to systems and methods that enhance the security of resource access using hierarchical deterministic (HD) cryptography and the blockchain. More particularly, certain embodiments of the present disclosure relate to systems and methods that securely and anonymously represent the identity of a user and the user's access code data on a distributed ledger represented across the blockchain.

BACKGROUND

Traditional digital delivery and redemption of access rights is convenient for users, but very insecure. Fraudulent actors can easily misappropriate access codes of valid access rights. For example, an access-right holder (used interchangeably with "user" herein) seeking to assign an access right on a digital platform may unintentionally post an image of an access code (e.g., barcode). Fraudulent actors can scrape digital platforms for accidentally posted access codes. Once that access code is detected, the fraudulent actors can create a fake access right and enter or access the resource early, preventing the true owner of the access right from accessing the resource. Further, access code scanning validates the access right, but typically, the access-right holder accessing the spatial area (e.g., spatial area) is not authenticated as the owner of the access right. The lack of identity authentication tends to facilitate fraudulent entry or access into resources. Existing solutions that do authenticate access-right holders as they enter the spatial area expose additional challenges relating to privacy and security, for example, when dealing with public networks and untrusted actors.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Certain embodiments of the present disclosure described herein relate to systems and methods that enhance and efficiently implement access control to resources. Instead of storing sensitive information (e.g., member IDs and access codes) in a centralized server, certain embodiments relate to systems and methods for providing distributed ledgers that securely and deterministically represent the identity of access-right holders (e.g., access-right holders) and sensitive access code data. Further, certain embodiments relate to systems and methods that represent or publish the distributed ledger across a public or private blockchain, to securely manage identity-based entry of access-right holders at resources. According to certain embodiments, the security of resource access control is substantially enhanced because an ACL (access control list) device located at an entry gate of a venue can authenticate an access-right holder using an encrypted resource manifest posted on the distributed ledger.

In some implementations, sensitive information, such as access-right holder identities and access code data, may be encrypted using hierarchical deterministic (HD) cryptographic techniques. For example, any number of data items that are sensitive (e.g., stored in a private database) may be inputted into one or more key derivation functions (KDFs) to derive a key pair that anonymously and uniquely represents the identity of an access-right holder. A KDF may take as input any source of initial keying material, such as the unique member identifier of an access-right holder and a unique resource identifier, and derive from it one or more cryptographically strong secret keys. HD cryptography enables a primary access-right issuer to publish encrypted versions of sensitive data (e.g., access-right holder identity and access code data) openly on a distributed ledger. Advantageously, in some implementations, the ledger can be distributed across the various ACL devices located around the venue. It will be appreciated that an ACL device may be any portable (e.g., smartphone, scanning device, tablet, laptop, etc.) or non-portable (e.g., desktop computer, electronic kiosk or turnstile) computing device that is configured to retrieve data from another device using optical scanning or short-range communication channels (e.g., Bluetooth, Zigbee, NFC, RFID, etc.). In these implementations, each ACL device may serve as a blockchain node storing and updating the ledger. Thus, as described in greater detail below, the ACL devices can securely receive a resource-specific private key that can be used to decode the encrypted access codes stored on the distributed ledger, without needing to communicate with a central server. In other words, secure resource access control can be entirely managed by the ACL devices within a spatial area, even if the public network to which the ACL devices are connected is considered unsecure.

In some implementations, an access-right holder's private information, such as name, email address, member ID, etc., can be stored in a private, centralized database, not on the distributed ledger. Portions of the available private information (e.g., a unique member identifier representing an access-right holder) can be used as inputs to HD cryptography functions. The resulting key pairs, anonymous addresses, and accounts, can be referenced and applied openly and securely on the distributed ledger that is represented on the public blockchain. To illustrate and as a non-limiting example, an access-right holder's member identifier (e.g., unique username representing the access-right holder) and the unique resource identifier (the values of which can be stored at the private, centralized database) can be used as inputs to HD cryptography functions to derive an anonymous address that cannot be traced back to the access-right holder and cannot be reused for another resource. For example, the access-right holder's member identifier can be inputted into a key derivation function to derive a parent key pair representing the access-right holder. However, because the parent key pair uniquely represents the access-right holder, much like a user ID or email address, a child key pair may be derived using the resource-specific identifier as an input to sufficiently anonymize the access-right holder. The child key pair may include a child private key and a child public key. A truncated version of the child public key may serve as the anonymous address that anonymously and uniquely represents the access-right holder's attendance at the resource. In other words, a single anonymous address may uniquely represent a specific access-right holder's attendance at a specific resource. In some implementations, anonymous addresses may be any alphanumeric string of information generated in response to any access-right holder-identifying data element (e.g., member ID, username, email, phone number, etc.) that is passed through an HD cryptographic algorithm. Further, anonymous addresses derived from a public key can be truncated by any suitable data-truncation technique, including, for example, generating a 160-bit hash of the public key. Advantageously, the anonymous address is resource specific. Thus, the same access-right holder attending two different resources will be associated with two different anonymous addresses, thereby enhancing the anonymity of the resource access control.

In some implementations, the anonymous addresses for all access-right holders attending a resource can be published to a distributed ledger of a public blockchain as a resource manifest. Doing so, according to embodiments described herein, enables an access-right system to securely control access to resources by authenticating access-right holders against the distributed ledger (containing valid, but encrypted access codes), while at the same time, maintaining the privacy of the access-right holders attending or accessing the resource. As a result, an anonymous address represented on the distributed ledger can be used to verify a specific access-right holder's attendance at a specific resource without exposing the access-right holder's identity—and in some implementations, potentially without calling a central server. Further, the anonymous address for an access-right holder can only be used to uniquely represent the access-right holder's attendance to a specific resource. Additionally, a new resource-specific key pair can be generated by inputting a unique resource identifier (or any other similar unique identifier that represents a resource or that is associated with a resource) into a KDF, and subsequently using the resulting resource-specific public key to encrypt the access code portion of the resource manifest that is published on the public ledger. As an advantage, if the access code associated with an anonymous address is decrypted by a hacker (e.g., if the resource-specific private key is misappropriated), the hacker cannot use the decrypted information to fraudulently access any other resources; thereby, limiting any impact of a potential, but extremely unlikely hack. In some implementations, the resource manifest that is represented on the distributed ledger can be padded with artificial anonymous addresses to obfuscate business intelligence that could be detected from the distributed ledger.

It will be appreciated that the present disclosure is not limited to the use of the member identifier and resource identifier as inputs for the HD cryptography functions. As such, any information that can be used to uniquely identify an access-right holder (even if the information uniquely identifies an access-right holder only when combined in a string of other data items of identifying information) can also be used as an input to the HD cryptography functions described above. Non-limiting examples of potential inputs may include any permutation of member identifier, resource identifier, venue identifier, gate number, section number, row or seat number, date or time of resource, any zero or non-zero flags, such as whether the access-right holder is a VIP member or not, and any other suitable identifying information. However, if HD path implementations require the use of numerical indices, then the identifiers described above and herein may be converted into a numerical representation, such as a corresponding integer or series of integers, which compose a portion of the derivation path.

In some implementations, the anonymous addresses for all the resource attendees can be published to a distributed ledger without exposing the identity of any of the attendees. For example, a resource manifest can be published to a distributed ledger on a public blockchain. However, often the resource manifest contains valuable business intelligence that primary access-right issuers, venue managers, or performers typically intend to keep confidential (e.g., the number of attendees for a resource). While the identity of the access-right holders represented by the distributed ledger cannot be uniquely identified from the distributed ledger, nonetheless, the number of access-right holders attending the resource (and other business intelligence) could potentially be identified by competitors. To address this, certain embodiments of the present disclosure involve obfuscating the distributed ledger with artificial profiles (i.e., fake anonymous addresses listed in the resource manifest published to the distributed ledger). For example, the distributed ledger could be padded with artificial anonymous addresses, which can be generated for artificial access-right holders and inserted into the resource manifest stored on the distributed ledger. The access-right systems can identify which anonymous addresses are artificial and which correspond to real access-right holders, but externally, all of the anonymous addresses appear to represent real access-right holders, thereby achieving a form of Differential Privacy. In some implementations, both real and artificial anonymous addresses can be altered with a message or flag to indicate a resource access, for example. As the resource becomes available for access (e.g., even begins), the artificial resource entry messages or flags can alter the artificial anonymous addresses at a velocity that mimics real resource entry rates at the start of a resource. For example, artificial anonymous addresses may be altered with a flag indicating that the access-right holder has entered the venue at a rate of 50 access-right holders every 5 minutes.

In some implementations, a key pair can be derived for a specific resource (e.g., a resource-specific private key and a resource-specific public key) by inputting a unique resource identifier into a key derivation function. The access code for each access right can be encrypted using the resource-specific public key. The encrypted access code data can then be posted to the distributed ledger represented across the blockchain. On the day of the resource, the ACL scanning device (located at the entry gate of the venue) can securely retrieve the resource-specific private key from a secure keystore server (e.g., using a native app or SDK) to decrypt the encrypted access codes. Thus, all relevant information for facilitating access control to a resource (e.g., access-right holder identities and access code information) can be published on distributed ledger represented across the blockchain, thereby avoiding the need for system calls to the central database.

In some implementations, instead of validating an access code of an access right, access control into a resource may be based on authenticating that an access-right holder is in possession of a cryptographic account or private key. In some implementations, authentication that an access-right holder possesses a cryptographic account or private key may take the form of an attendance-specific private key (e.g., which may be ephemeral) retrieved from a central server for the purposes of being scanned or retrieved by a gate entry device. The attendance-specific private key could be known by a gate entry device in advance, if the access-right holder is in custody of an HD "wallet". In some implementations, the present disclosure envisions the use a signed message to authenticate that the access-right holder is in possession of a specific cryptographic account or private key, which is known to the access-right system that is managing the resource. Digitally signing a message is a technique for authenticating a document or digital message. Further, signing a message can be used as a form of proof that the sender of a signed message is in possession of the private key associated with the access-right holder (more specifically, associated with the anonymous address representing the access-right holder). As a non-limiting example, a native application or an SDK running on an access-right holder's smartphone can be configured to digitally sign a payload (e.g., any message) with the access-right holder's private key. Then, when the access-right holder arrives at the resource, the ACL device located at the entry gate can retrieve the access-right holder's public key from the access-right holder's smartphone. The ACL device can use the access-right holder's public key to verify the signed payload (e.g., determine whether the access-right holder's smartphone contains the access-right holder's private key). Advantageously, authenticating an access-right holder instead of validating an access code (e.g., barcode) of an access right (e.g., electronic ticket) can enable venues to facilitate resource entry when the ACL device determines or identifies which access rights are associated with that access-right holder identity. As an additional advantage, using ACL devices located at the venue to authenticate that the access-right holder is in possession of the access-right holder's private key prevents fraudulent actors from misappropriating valid access codes. For instance, if a fraudulent actor steals a valid access code, and then attempts to enter or access the resource, the ACL device will prohibit the fraudulent actor from entering the resource because the fraudulent actor cannot be authenticated as the holder of the true access-right holder's cryptographic account.

In some implementations, the native application or SDK running on the access-right holder's smartphone can be configured to digitally sign a payload by creating a message with at least three data fields: (1) a data field containing the anonymous address associated with the access-right holder; (2) a data field containing a payload (e.g., a custom string of alphanumeric text); and (3) a data field containing an encrypted string that is generated based on the anonymous address, the access-right holder's private key, and the payload. The three data fields described above are exemplary, and thus, the present disclosure is not limited to the example described above. The native application or SDK can use any suitable technique to digitally sign a payload that can be verified by an ACL device. In some implementations, the payload included in the signed message may be generated based on an unpredictable time-sensitive code (e.g., a block hash). These implementations add a temporal dimension to the authentication by the ACL device, thereby making access control to the venue fraud proof. In some implementations, instead of digitally signing a timestamp with an access-right holder's anonymous address, the native application or SDK running on the access-right holder's smartphone can sign the resource-specific private key with a block hash (which is unpredictable and newly created every 10-15 seconds from a blockchain). A timestamp can be predicted by fraudulent actors, and thus, is not sufficiently secure to use as a payload for signing. In some implementations, any continuously randomly generated data can be used instead of the block hash.

In some implementations, an ACL device can receive key pairs (e.g., resource-specific private keys or access-right holder-specific public keys) to decode (with a private key) or verify (with a public key) sensitive data specific to the group of seats in the section that corresponds to the ACL device. For example, the ACL device located at the entrance of a particular section of seats can be configured to retrieve and store the corresponding key pairs for the seats within the particular section. In some implementations, each ACL device within the venue can store the distributed ledger, thereby serving as a blockchain node. As one ledger of the distributed ledgers is updated after an entry event is detected at a single ACL device, the remaining ACL devices may automatically update their corresponding ledger in response to the detected entry event without needing to access a central server. In some implementations, the ACL device may not serve as a blockchain node itself, but rather, the ACL device may be configured to access the distributed ledger represented across a public or private blockchain.

It will be appreciated that, while the above Summary describes asymmetric HD cryptography techniques being used to derive key pairs, anonymous addresses, and accounts, symmetrical cryptography techniques can be used in addition to or in lieu of asymmetric cryptography. It will also be appreciated that, while the key pairs described above and herein are derived from asymmetric key derivation functions, the private keys or public keys can be transformed into any suitable format. It will also be appreciated that the present disclosure is not limited to deriving an anonymous address by truncating the public key, and thus, other techniques for deriving anonymous addresses or accounts can be performed. It will also be appreciated that, as an ACL device wirelessly communicates with an access-right holder's smartphone to authenticate the access-right holder's ownership of a cryptographic account or to retrieve the access-right holder's anonymous address, the ACL device can sign a payload indicating that the access-right holder has entered the venue or has entered a specific gate of the venue and update the distributed ledger with the signed payload. The signed payload (indicating the entry event) can be published to the distributed ledger in association with the anonymous address of the access-right holder. As a non-limiting example, the payload may be the message "Entered," and the message can be signed using the resource-specific private key, which may be known to the ACL device.

Certain embodiments may include a computer-implemented method. The computer-implemented method may include: storing, at a private database, one or more sensitive data items (e.g., member identifier, access-right holder's email address or phone number, resource identifier, access code, etc.), each sensitive data item of the one or more sensitive data items being capable of uniquely identifying an access-right holder, a resource, or an access right by itself or in combination with one or more additional data items. The computer-implemented method also includes retrieving, by a server (e.g., by the hierarchical deterministic (HD) cryptography system), the one or more sensitive data items from the private database. The computer-implemented method also includes inputting the one or more sensitive data items into one or more HD cryptography algorithms. The computer-implemented method also includes in response to inputting the one or more sensitive data items into the one or more HD cryptography algorithms, deriving an anonymous address that uniquely and anonymously represents the access-right holder. The computer-implemented method also includes deriving a resource-specific private key and public key (e.g., key pair) using the unique identifier representing the specific resource. The computer-implemented method also includes retrieving an access code of an access right. The computer-implemented method also includes encrypting the access code using the resource-specific public key. The computer-implemented method also includes publishing the anonymous address representing the access-right holder and the encrypted access code on a distributed ledger represented across a public or private blockchain. Other embodiments of this aspect include corresponding computer systems, apparatus, and computer programs recorded on one or more computer storage devices, each configured to perform the actions of the methods.

Implementations may include one or more of the following features. The computer-implemented method further including: at a later time, retrieving, by an ACL (access control list) device the resource-specific private key. The computer-implemented method may also include determining that a user device operated by the access-right holder is within a defined proximity of the ACL device. The computer-implemented method may also include retrieving the anonymous address from the user device (e.g., through a native application or SDK). The computer-implemented method may also include referencing the distributed ledger to determine whether the retrieved anonymous address is associated with any decrypted access codes. The computer-implemented method may also include, in response to determining that the retrieved anonymous address is associated with the decrypted access code, granting the access-right holder entry to a spatial area. The computer-implemented method may also include, in response to determining that the retrieved anonymous address is not associated with the decrypted access code, prohibiting the access-right holder from entering the spatial area. The computer-implemented method where a plurality of ACL devices are located around the spatial area, where each ACL device of the plurality of ACL devices is located at an entry gate to the spatial area, and the plurality of ACL devices serve as the blockchain, such that each ACL device is a blockchain node that stores the distributed ledger (e.g., the secure resource manifest). The computer-implemented method further including: storing a resource manifest on the distributed ledger represented across the public or private blockchain, the resource manifest including a unique anonymous address and an encrypted access code for each access-right holder attending the resource. The computer-implemented method where one or more artificial anonymous addresses are added to the resource manifest to obscure the resource manifest, and where the one or more anonymous addresses are generated by and known to the server. The computer-implemented method further including: signing, by a native application or an SDK running on a user device operated by the access-right holder, a payload using a private key associated with the access-right holder. The computer-implemented method may also include verifying, by an ACL device, the signed payload using the public key associated with the access-right holder, where verifying the signed payload indicates that the native application or the SDK has stored or is in possession of the private key associated with the access-right holder. The computer-implemented method may also include in response to successfully verifying the signed payload, granting the access-right holder entry to a spatial area. The computer-implemented method where signing the payload may including signing the resource-specific private key with a block hash. The computer-implemented method where signing the payload may include signing the anonymous address representing the access-right holder or the resource-specific private key, and where the signing uses an unpredictable time-sensitive code. Implementations of the described techniques may include hardware, a method or process, or computer software on a computer-accessible medium.

Certain embodiments may also include a system. The system may include one or more data processors; and a non-transitory computer-readable storage medium containing instructions which, when executed on the one or more data processors, cause the one or more data processors to perform operations including the method(s) described above and herein.

Certain embodiments may also include a computer-program product tangibly embodied in a non-transitory machine-readable storage medium, including instructions configured to cause a data processing apparatus to perform operations including the method(s) described above and herein.

Advantageously, according to certain embodiments of the present disclosure, implementing access control using HD cryptography and the blockchain enhances the reliability of access-right holder attendance at resources (e.g., reducing fraudulent access to resources). In addition, access code data, which is highly sensitive information, can be encrypted and published to the distributed ledger and represented across the various nodes of the blockchain. Further, the encrypted access codes are secure because they are encrypted using a one-time resource-specific key. The embodiments described herein complement existing access-right systems because existing ACL devices can be used to retrieve the resource's private key (e.g., using a native application or SDK) to decrypt the encrypted access codes at the time of entry. Even if the resource's private key is leaked or misappropriated by a hacker, the resource's private key is a one-time code that is specific to the resource. Thus, any damage, which is highly unlikely, is insulated only that specific resource. Moreover, the resource-specific public and private keys are derived from a single seed root and are not saved in a database, which reduces the attack vectors by potential bad actors.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
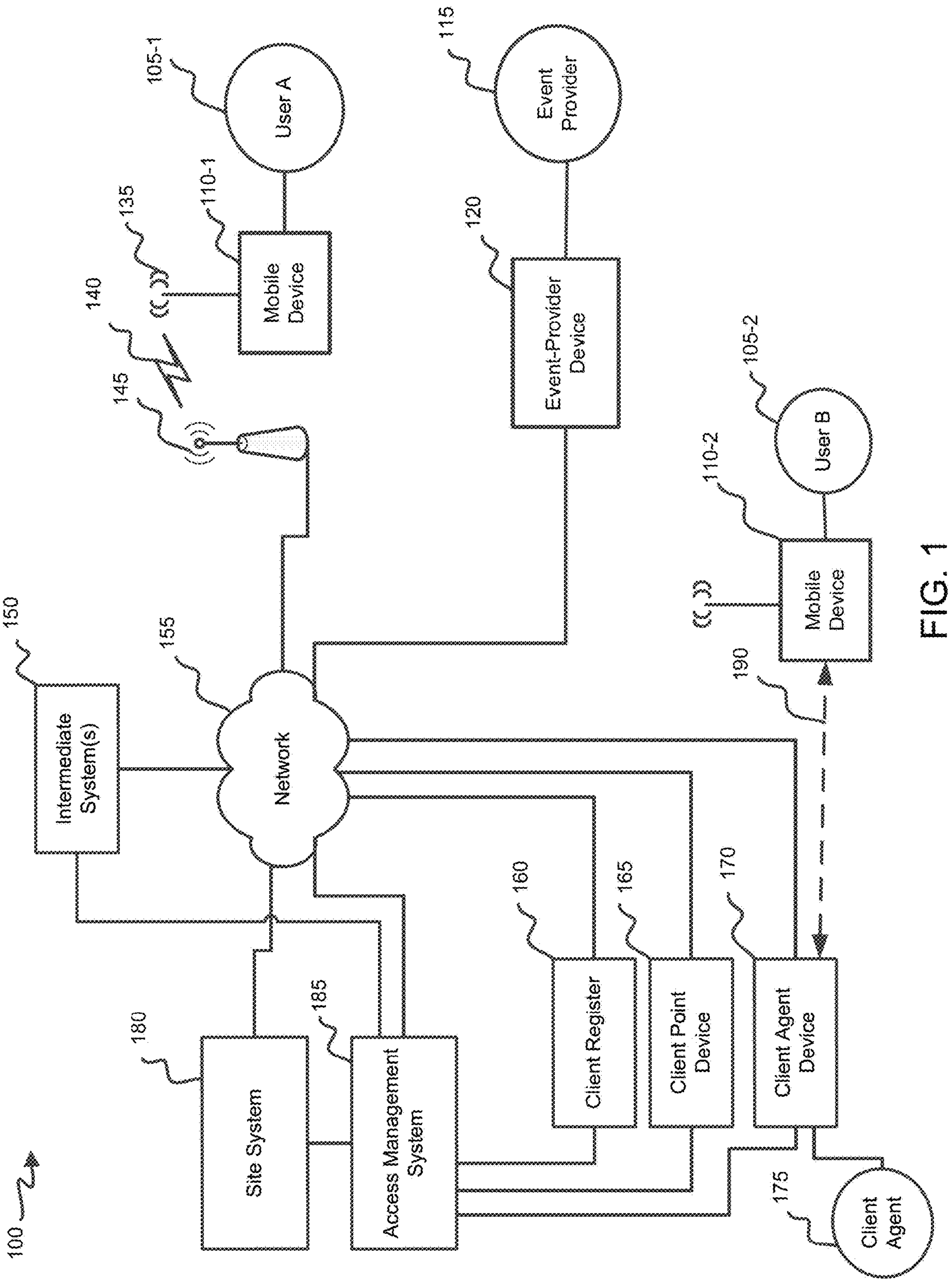
FIG. 1 depicts a block diagram of an embodiment of a resource access-facilitating interaction system.

Managing access-right assignment using a centralized server can be insecure and inefficient. For instance, a primary access-right issuer may generate a unique access-enabling code (e.g., a barcode) for each access right to a resource (e.g., event). The unique access-enabling codes may then be stored at a central server operated by the primary access-right issuer. However, the central server can be a target for network attacks by hackers. Further, the central server can experience times of high-load when access rights are first posted for sale. Servers can overheat and go offline or slow down substantially, which causes frustration to users trying to purchase or transfer access rights on an online platform.

Additionally, traditional digital delivery and redemption of access rights is convenient for users, but very insecure. Venues provide infrastructure, such as ACL devices located at entry gates, to scan access rights and enable authorized users to access resources. However, fraudulent actors can exploit entry based on scanning access codes alone. For instance, entry by access code scanning does not authenticate the identity of the user entering the venue. Thus, if a valid access right is presented to an ACL device at a spatial area, the access-right holder will be granted entry to the resource, even if the access-right holder fraudulently misappropriated the access right. However, fraudulent entry is troublesome, in part because the fraudulent actors displace true users of a performer. Some solutions present an identity challenge to the users entering the venue to authenticate the users, for example, by causing the ACL device to retrieve certain unique information stored on the user's smartphone. However, these solutions expose additional challenges around privacy and security, especially when public networks and untrusted actors are involved.

The technical challenges described above can be improved by creating a blockchain-based access-right system to manage the access control aspects of resources. In some implementations, a blockchain-based access-right system can create a secure resource manifest that is published to a distributed ledger represented across a public, private, and/or permissioned blockchain (or any hybrid combination). For instance, instead of relying on sensitive access code data stored at a central server, an access-right system can use the techniques described herein to publicly and securely store anonymous addresses that represent real users attending the resource. Additionally, the resource manifest created using the techniques described herein can include encrypted access code information, which can be easily and securely decrypted by ACL devices at the spatial area when a user requests entry to the resource. Embodiments and the variations thereof are described below.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 depicts a block diagram of an embodiment of a resource management system 100, according to an embodiment of the present disclosure. Mobile device 110 (which can be operated by a user 105) and an event-provider device 120 (which can be operated, controlled, or used by an event provider 115) can communicate with an access management system 185 directly or via another system (e.g., via an intermediate system 150). Mobile device 110 may transmit data to access point 145, which is connected to network 155, over communication channel 140 using antennae 135. While FIG. 1 illustrates mobile device 110 communicating with access point 145 using a wireless connection (e.g., communication channel 140), in some embodiments, mobile device 110 may also communicate with access point 145 using a wired connection (e.g., an Ethernet connection). Mobile device 110 can also communicate with one or more client devices, such as a client agent device 170 operated by a client agent 175, a client register 160 or a client point device 165 using a wired or wireless connection. In addition, using the access management system 185, an event provider 115 can identify an event, a parameter of attending the event, a date or dates of the event, a location or locations of the event, etc. Each inter-system communication can occur over one or more networks 155 and can facilitate transmission of a variety of types of data. It will be understood that, although only one of various systems, devices, entities and network are shown, the resource management system 100 can be extended to include multiple of any given system(s), device(s), entity(ies), and/or networks.

Access management system 185 can be configured to manage a dynamic set of access rights to one or more resources. More specifically, access management system 185 can track which resources are to be made available to users, specifications of the resources and times at which they will be available. Access management system 185 can also allocate access rights for resources and facilitate transmissions of notifications of the available rights to a set of user devices. For example, access management system 185 can alert users of the availability via a website, app page or email. As another example, access management system can transmit data about access rights and resources to one or more intermediate systems 150, which can facilitate distribution of access-right availability and processing of requests for such rights.

Notifications of available access rights can be accompanied by options to request that one or more access rights be assigned to a user. Therefore, user 105 can provide input to mobile device 110 via an interface to request such assignment and provide other pertinent information. Intermediate system 150 and/or access management system 185 can process the request to ensure that the requested access right(s) remain available and that all required information has been received and, in some instances, verified. Thereafter, access management system 185 can assign one or more access rights to the user, e.g., matching the access rights requested by the user.

In some implementations, access management system 185 may include a blockchain-based access-right system that includes plurality of nodes. Each node of the plurality of nodes can store a public ledger comprised of smart contracts. A smart contract can include the attributes, functions, and/or policies of an access right to a resource. Further, the smart contract can self-execute so as to digitally facilitate, verify, or enforce the attributes, functions, and/or policies contained within the smart contract. For example, a smart contract may include a policy prohibiting any resale of the access right after the access right is purchased from the primary access-right issuer. In this case, the access-right would be prohibited from being sold on a reassignment platform (e.g., secondary marketplace).

Assigning an access right can include, for example, associating an identifier of the right with an identifier of a user, changing a status of the right from available to assigned, facilitating a cease in notifications that the access right is available, generating an access-enabling code to use such that the corresponding access will be permitted and/or generating a notification to be received at mobile device 110 confirming the assignment and/or including data required for corresponding access to be permitted.

In some instances, a resource is at least partly controlled, by a client. The resource may be accessed at a particular location or structure, and a variety of client devices may be present at the location so as to facilitate usage of an access right. Exemplary client devices can include client agent device 170, which can be one operated by a client agent 175 (e.g., a human client agent), a client register 160 (e.g., which can operate independently of an agent and/or can be connected to or include a device that, while in a locked mode, can impede resource access, such as a turnstile) and client point device 165 (e.g., which can operate independently of an agent and/or can be positioned at or around the resource-associated location. For example, in some instances client agent device 170 can be operated by an agent at a location for a resource that is an event ("event resource") taking place at the location. In this example, client agent device 170 is used by an agent that is manning an entrance to the location (e.g., which can include, for example, a location of a structure or a geographic region) or a part thereof; client register 160 can be or can be connected to a turnstile, gate or lockable door that is positioned along a perimeter or entrance to a resource-associated location or part thereof; and client point device 165 can be an electronic device positioned at or within a resource-associated location.

In some instances, mobile device 110 performs particular functions upon detecting a client device and/or the contrary. For example, mobile device 110 may locally retrieve or request (e.g., from an external source) an access-enabling code. The access-enabling code can be transmitted to the client device or a remote server (e.g., a server hosting access management system 185) for evaluation and/or can be locally evaluated. The evaluation can include, for example, confirming that the access-enabling code has a particular characteristic or format (e.g., generally or one characteristic corresponding to a particular resource or type of access), matches one in an access-enabling code data store and/or has not been previously redeemed. A result of the evaluation can be locally displayed at an evaluating device, can control a device component (e.g., a physical access control module), and/or can be transmitted to another device, such as mobile device 110.

In some instances, user 105 can use multiple mobile devices 110 to perform various operations (e.g., using one device to request an access right and another to interact with client devices). Some instances of mobile device 110, access management system 185, intermediate system 150, client agent device 170, client register 160 and/or client point device 165 can include a portable electronic device (e.g., a smart phone, tablet, laptop computer or smart wearable device) or a non-portable electronic device (e.g., one or more desktop computers, servers and/or processors).

In exemplary embodiments, access rights can be represented in data maintained at a client device or at access management system 185. For example, a database or data store include a list of identifiers for each user or user device having an assigned access right for a resource or associating an identifier for each user or user device with an identifier of a particular access right. In some instances, indicia can be transmitted to a user device that indicates that an access right is availed. In various instances, it may be permitted or prohibited for the indicia to be transferred. The indicia may be provided as part of an electronic or physical object (e.g., a right to access an event) or independently. The indicia may include an access-enabling code.

In some instances, access management system 185 communicates with one or more intermediate systems 150, each of which may be controlled by a different entity as compared to an entity controlling access management system 185. For example, access management system 185 may assign access rights to intermediate systems 150 (e.g., upon acceptance of terms). Intermediate system 150 can then collect data pertaining to the assigned access rights and/or a corresponding event, can format and/or edit the data, generate a notification of availability of the access rights that includes the formatted and/or edited data and facilitate presentation of the notification at a mobile device 110. When intermediate system 150 receives a communication from the mobile device 110 indicative of an access-right request, intermediate system 150 can facilitate assignment (or reassignment) of an access right to the user (e.g., by transmitting relevant information to access management system 185 identifying the user and/or user device and/or by transmitting relevant information to mobile device 110 pertaining to the access right).

A resource can include one managed or provided by a client, such as an entity or an entity operating a spatial region. A mobile device 110 can transmit data corresponding to the access right (e.g., an access-enabling code) to a client device upon, for example, detecting the client device, detecting that a location of the mobile device 110 is within a prescribed geographical region, or detecting particular input. The receiving client device may include, for example, a client agent device 170 operated at an entrance of a defined geographical location or a client register 160 that includes or is attached to a locking turnstile. The client device can then analyze the code to confirm its validity and applicability for a particular resource and/or access type, and admittance to the event can be accordingly permitted. For example, a turnstile may change from a locked to an unlocked mode upon confirmation of the code's validity and applicability.

Each of the depicted devices and/or systems may include a software agent or application ("app") that, when executed, performs one or more actions as described herein. In some instances, a software agent or app on one device is, at least in part, complementary to a software agent or app on another device (e.g., such that a software agent or app on mobile device 110 is, at least in part, complementary to at least part of one on access management system 185 and/or a client device; and/or such that a software agent or app on intermediate system 150 is, at least in part, complementary to at least part of one on access management system 185).

In some instances, a network in the one or more networks 155 can include an open network, such as the Internet, personal area network, local area network (LAN), campus area network (CAN), metropolitan area network (MAN), wide area network (WAN), wireless local area network (WLAN), a private network, such as an intranet, extranet, or other backbone. In some instances, a network in the one or more networks 155 includes a short-range communication channel, such as Bluetooth or Bluetooth Low Energy channel. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications.

In one embodiment, communications between two or more systems and/or devices can be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), extended TEA (XTEA), Corrected Block TEA (XXTEA), and/or RC5, etc.

It will be appreciated that, while a variety of devices and systems are shown in FIG. 1, in some instances, resource management system 100 can include fewer devices and/or systems. Further, some systems and/or devices can be combined. For example, a client agent device 170 may also serve as an access management system 185 or intermediate system 150 so as to as to facilitate assignment of access rights.

As described in further detail herein, an interaction between mobile device 110 and a client device (e.g., client agent device 170, client register 160 or client point device 165) can facilitate, for example, verification that user 105 has a valid and applicable access right, obtaining an assignment of an access right, and/or obtaining an assignment of an upgraded access right.

In addition, mobile device 110-2, which is operated by user 125-2, may include a user device that is located at a spatial region of the resource (e.g., venue) during a time period for which the resource is accessible (e.g., event time). Mobile device 110-2 may directly interact with a client device (e.g., client agent device 170, client register 160 or client point device 165), which is also located at the spatial region during the time period in which the resource is accessible using access rights. As such, the access management system 185 may be updated or accessed by mobile device 110-2 via the client agent device 170. For example, mobile device 110-2 may communicate with the client agent device 170 over a short-range communication channel 190, such as Bluetooth or Bluetooth Low Energy channel, Near Field Communication (NFC), Wi-Fi, RFID, Zigbee, ANT, etc. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications. After the short-range communication link 190 is established, mobile device 110-2 may communicate with the access management system 185 and access the item or items of resources. That is, while mobile device B is configured to communicate over network 155, mobile device 110-2 may communicate with the access management system 185 via the client agent device 170, instead of the network 155.

It will be appreciated that various parts of system 100 can be geographically separated. It will further be appreciated that system 100 can include a different number of various components rather than a number depicted in FIG. 1. For example, two or more of access assignment systems 185; one or more site systems 180; and intermediate system 150 may be located in different geographic locations (e.g., different cities, states or countries).

Figure 2:
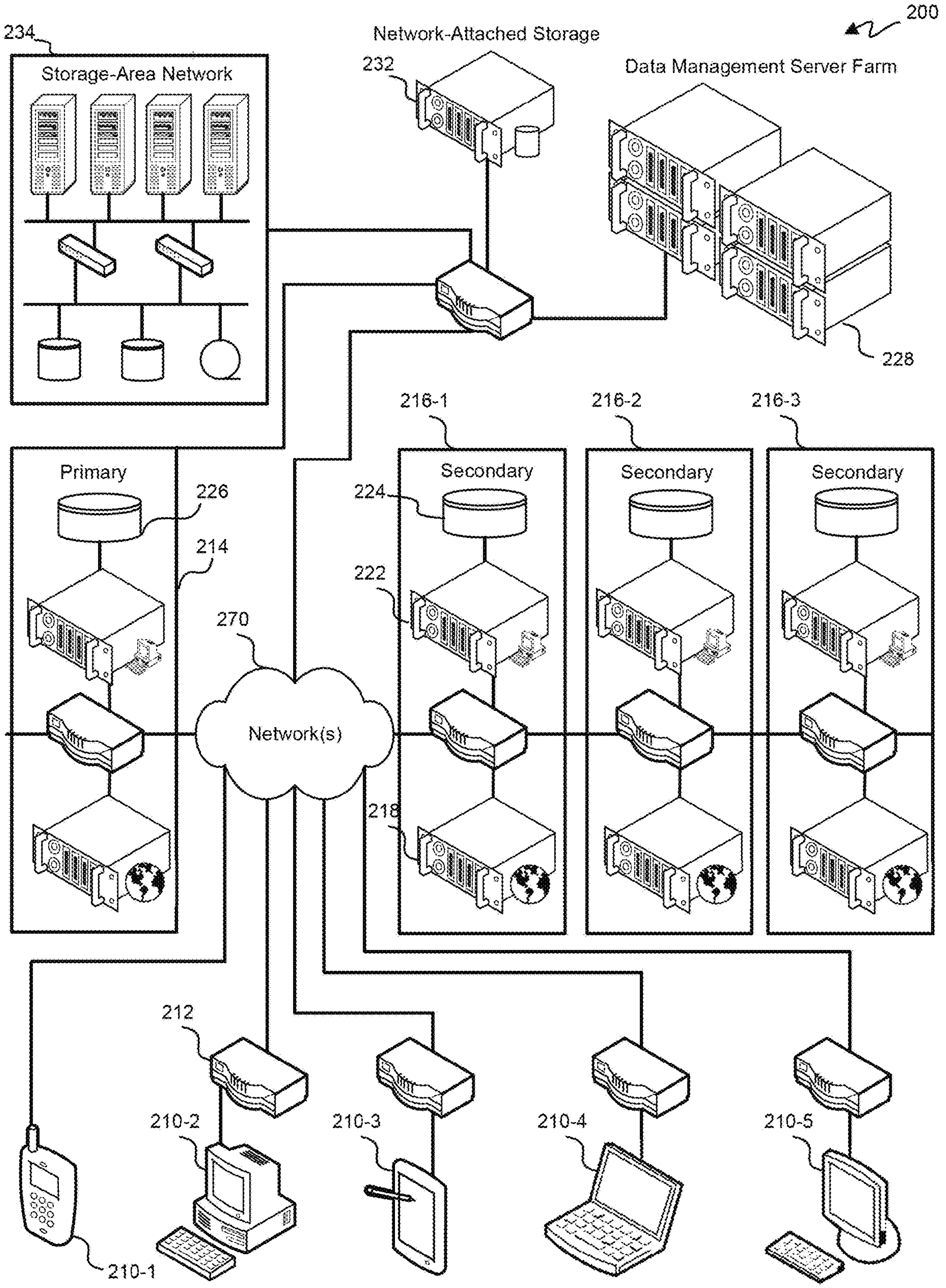
FIG. 2 shows an illustration of hardware and network connections of a resource access-facilitating interaction system according to an embodiment of the invention.

FIG. 2 shows an illustration of hardware and network connections of a resource access-facilitating interaction system 200 according to an embodiment of the invention. Each of various user devices 210-1, 210-2, 210-3, 210-4 and 210-5 can connect, via one or more inter-network connection components (e.g., a router 212) and one or more networks 270 to a primary assignment management system 214 or a secondary assignment management system 216-1, 216-2 or 216-3.

Primary assignment management system 214 can be configured to coordinate and/or control initial assignment of access rights. Secondary assignment management system 216 can be configured to coordinate and/or control reassignment and/or transfer of access rights (e.g., from one user or user device to another or from an intermediate agent to a user or user device). Secondary assignment management system 216 may also manage transfer offers (e.g., to allow a first user to identify a price at which a transfer request would be granted and to detect if a valid request is received). It will be appreciated that, although primary assignment management system 214 is shown to be separate from each secondary assignment management system 216, in some instances, an assignment management system may relate to both a primary and secondary channel, and a single data store or a localized cluster of data stores may include data from both channels.

Each of primary access assignment system 214 and secondary access assignment system 216 can include a web server 218 that processes and responds to HTTP requests. Web server 218 can retrieve and deliver web-page data to a user device 210 that, for example, identify a resource, identify a characteristic of each of one or more access rights for the resource, include an invitation to request assignment of an access right, facilitate establishment or updating of a profile, and/or identify characteristics of one or more assigned access rights. Web server 218 can be configured to support server-side scripting and/or receive data from user devices 210, such as data from forms or file uploads.

In some instances, a web server 218 can be configured to communicate data about a resource and an indication that access rights for the resource are available. Web server 218 can receive a request communication from a user device 210 that corresponds to a request for information about access rights. The request can include one or more constraints, which can correspond to (for example) values (e.g., to be matched or to define a range) of particular fields.

A management server 222 can interact with web server 218 to provide indications as to which access rights' are available for assignment, characteristics of access rights and/or what data is needed to assign an access right. When requisite information is received (e.g., about a user and/or user device, identifying a final request for one or more access rights, including payment information, and so on), management server 222 can coordinate an assignment of the one or more access rights. The coordination can include updating an access-right data store to change a status of the one or more access rights (e.g., to assigned); to associate each of the one or more access rights with a user and/or user device; to generate or identify one or more access-enabling codes for the one or more access rights; and/or to facilitate transmission reflecting the assignment (e.g., and including the one or more access-enabling codes) to a user device.

Management server 222 can query, update and manage an access-right data store to identify access rights' availability and/or characteristic and/or to reflect a new assignment. The data store can include one associated with the particular assignment system. In some instances, the data store includes incomplete data about access rights for a resource. For example, a data store 224 at and/or used by a secondary access assignment system 216 may include data about an incomplete subset of access rights that have been allocated for a particular resource. To illustrate, a client agent may have indicated that an independent intermediary system can (exclusively or non-exclusively) coordinate assignment of a portion of access rights for a resource but not the remainder. A data store 224 may then, for example, selectively include information (e.g., characteristics, statuses and/or assignment associations) for access rights in the portion.

Data store 224 or 226 associated with a particular primary or secondary access assignment system can include assignment data for a set of access rights that are configured to be set by the particular primary or secondary access assignment system or by another system. For example, a rule can indicate that a given access right is to have an available status until a first of a plurality of access assignment systems assigns the access right. Accordingly, access assignment systems would then need to communicate to alert each other of assignments.

In one instance, management server 222 (or another server in an access assignment system) sends a communication to a central data management server farm 228 reflecting one or more recent assignments. The communication may include an identification of one or more access rights, an indication that the access right(s) have been assigned, an identification of a user and/or user device associated with the assignment and/or one or more access-enabling codes generated or identified to be associated with the assignment. The communication can be sent, for example, upon assigning the access right(s), as a precursor to assigning the access right(s) (e.g., to confirm availability and/or request assignment authorization), at defined times or time intervals and/or in response to an assignment-update request received from data management server farm 228.

Data management server farm 228 can then update a central data store to reflect the data from the communication. The central data store can be part of, for example, a network-attached storage 232 and/or a storage-area network 234.

In some instances, a data store 224 or 226 can include a cache, that includes data stored based on previous communications with data management server farm 228. For example, data management server farm 228 may periodically transmit statuses of a set of access rights (e.g., those initially configured to be assignable by an access assignment system) or an updated status (e.g., indicating an assignment) of one or more access rights. As another example, data management server farm 228 may transmit statuses upon receiving a request from an access assignment system for statuses and/or authorization to assign one or more access rights.

An access assignment system may receive statuses less frequently or at times unaligned with requests received from user devices requesting information about access rights and/or assignments. Rather than initiate a central data store query responsive to each user-device request, a management server 222 can rely on cached data (e.g., locally cached data) to identify availability of one or more access rights, as reflect in webpage data and/or communications responsive to request communications for access-right information. After requisite information has been obtained, management server 222 can then communicate with data management server farm 228 to ensure that one or more particular access rights have remained available for assignment.

In some instances, one or more of primary access assignment system 214 and/or a secondary access assignment system 214 need not include a local or system-inclusive data store for tracking access-right statuses, assignments and/or characteristics. Instead, the access assignment system may communicate with a remote and/or central data store (e.g., network-attached storage 232 or storage-area network 234).

Access management system 120 can include a primary access assignment system 214 and/or a secondary access assignment system 214; data management server farm 228; and/or a central data store (e.g., network-attached storage 232 or storage-area network 234). Each of one or more intermediate systems 130 can include a primary access assignment system 214 and/or a secondary access assignment system 214.

Data management server farm 228 may periodically and/or routinely assess a connection with an access assignment system 214. For example, a test communication can be sent that is indicative of a request to respond (e.g., with particular data or generally). If a response communication is not received, if a response communication is not received within a defined time period and/or if a response communication includes particular data (e.g., reflecting poor data integrity, network speed, processing speed, etc.), data management server farm 228 may reconfigure access rights and/or permissions and/or may transmit another communication indicating that assignment rights of the access assignment system are limited (e.g., to prevent the system from assigning access rights).

It will be appreciated that various parts of system 200 can be geographically separated. For example, two or more of primary access assignment system 214; one or more of secondary access assignment systems 214; and data management server farm 228 may be located in different geographic locations (e.g., different cities, states or countries).

It will further be appreciated that system 200 can include a different number of various components rather than a number depicted in FIG. 2. For example, system 200 can include multiple data management server farms 228, central data stores and/or primary access assignment systems 214 (e.g., which can be geographically separated, such as being located in different cities, states or countries). In some instances, processing may be split (e.g., according to a load-balancing technique) across multiple data management server farms 228 and/or across multiple access assignment systems 214. Meanwhile, the farms and/or systems can be configured to accept an increased or full load should another farm and/or system be unavailable (e.g., due to maintenance). Data stored in a central data store may also be replicated in geographically separated data stores.

Figure 3:
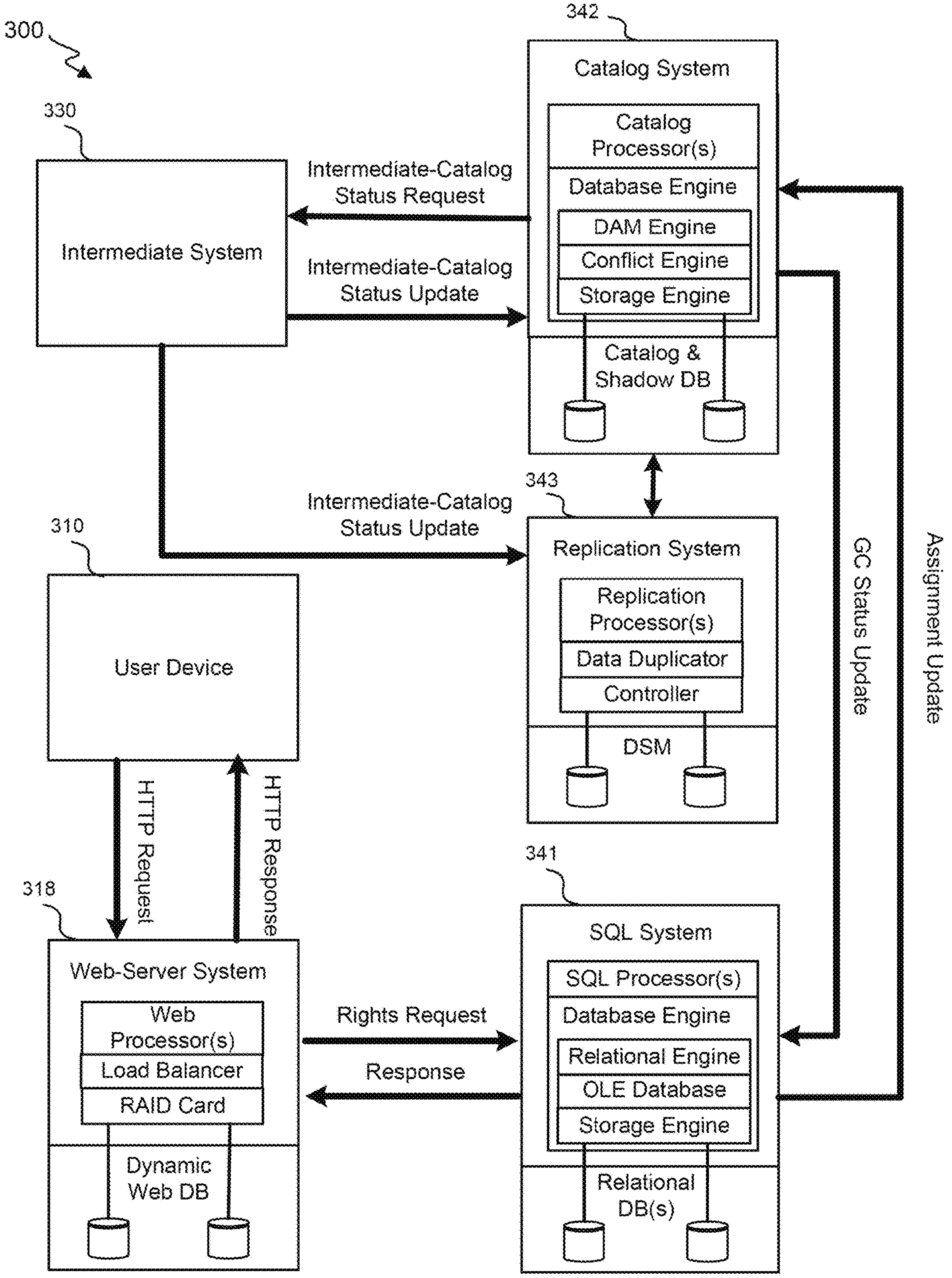
FIG. 3 shows an illustration of a communication exchange between components involved in a resource access-facilitating interaction system according to an embodiment of the invention.

FIG. 3 shows an illustration of a communication exchange between components involved in a resource access-facilitating interaction system 300 according to an embodiment of the invention. A user device 310 can send one or more HTTP requests to a web-server system 318, and web-server system 318 can respond with one or more HTTP responses that include webpage data. The webpage data can include, for example, information about one or more resources, characteristics of a set of access rights for each of the one or more resources, availability of one or more access rights, an invitation to request an assignment of one or more access rights and/or indications as to what information is required for an access-right assignment. HTTP requests can include assignment-request data (e.g., a resource identification, requisite information, and/or an identification of an access-right constraint or access right).

Web-server system 318 can include one or more web processors (e.g., included in one or more server farms, which may be geographically separated) to, for example, map a path component of a URL to web data (e.g., stored in a local file system or generated by a program); retrieve the web data; and/or generate a response communication including the web data. Web processor can further parse communication to identify input-corresponding data in HTTP requests, such as field values required for an access-right assignment.

Web-server system 318 can also include a load balancer to distribute processing tasks across multiple web processors. For example, HTTP requests can be distributed to different web processors. Load-balancing techniques can be configured so as, for example, to distribute processing across servers or server farms, decrease a number of hops between a web server and user device, decrease a geographical location between a user device and web server, etc.

Web-server system 318 can further include a RAID component, such as a RAID controller or card. A RAID component can be configured, for example, to stripe data across multiple drives, distribute parity across drives and/or mirror data across multiple drives. The RAID component can be configured to improve reliability and increase request-processing speeds.

Web-server system 318 can include one or more distributed, non-distributed, virtual, non-virtual, local and/or remote data stores. The data stores can include web data, scripts and/or content object (e.g., to be presented as part or web data).

Some HTTP requests include requests for identifications of access-right characteristics and/or availability. To provide web data reflecting such information, web-server system 318 can request the information from another server, such as an SQL system 341 (e.g., which may include one or more servers or one or more server farms).

SQL system 341 can include one or more SQL processors (e.g., included in one or more server farms, which may be geographically separated). SQL processors can be configured to query, update and otherwise use one or more relational data stores. SQL processors can be configured to execute (and, in some instances, generate) code (e.g., SQL code) to query a relational data store.

SQL system 341 can include a database engine, that includes a relational engine, OLE database and storage engine. A relational engine can process, parse, compile, and/or optimize a query and/or make query-associated calls. The relational engine can identify an OLE DB row set that identifies the row with columns matching search criteria and/or a ranking value. A storage engine can manage data access and use the rowset (e.g., to access tables and indices) to retrieve query-responsive data from one or more relational databases.

SQL system 341 can include one or more distributed, non-distributed, virtual, non-virtual, local and/or remote relational data stores. The relational databases can include linked data structures identifying, for example, resource information, access-right identifications and characteristics, access-right statuses and/or assignments, and/or user and/or user profile data. Thus, for example, use of the relational structures may facilitate identifying, for a particular user, a characteristic of an assigned access right and information about a resource associated with the access right.

One or more data structures in a relational data structure may reflect whether particular access rights have been assigned or remain available. This data may be based on data received from a catalog system 342 that monitors and tracks statuses of resource access rights. Catalog system 342 can include one or more catalog processors (e.g., included in one or more server farms, which may be geographically separated). Catalog processors can be configured to generate status-update request communications to be sent to one or more access assignment systems and/or intermediate systems and/or to receive status-update communications from one or more access assignment systems and/or intermediate systems. A status-update communication can, for example, identify an access right and/or resource and indicate an assignment of the access right. For example, a status-update communication can indicate that a particular access right has been assigned and is thus no longer available. In some instances, a status-update communication identifies assignment details, such as a user, profile and/or user device associated with an access-right assignment; a time that the assignment was made; and/or a price associated with the assignment.

In some instances, a status update is less explicit. For example, a communication may identify an access right and/or resource and request a final authorization of an assignment of the access right. Catalog system 342 can then verify that the access right is available for assignment (e.g., and that a request-associated system or entity is authorized to coordinate the assignment) and can transmit an affirmative response. Such a communication exchange can indicate (in some instances) that the access right is assigned and unavailable for other assignment.

In some instances, catalog system 342 can also be integrated with a non-intermediate access assignment system, such that it can directly detect assignments. For example, an integrated access assignment system can coordinate a message exchange with a user device, can query a catalog data store to identify available access rights and can facilitate or trigger a status-change of an access right to reflect an assignment (e.g., upon having received all required information.

Whether a result of a direct assignment detection or a status update from an intermediate system, a database engine of catalog system 342 can manage one or more data stores so as to indicate a current status of each of a set of access rights for a resource. The one or more data stores may further identify any assignment constraints. For example, particular access rights may be earmarked so as to only allow one or more particular intermediate systems to trigger a change to the access rights' status and/or to assign the access rights.

The database engine can include a digital asset management (DAM) engine to receive, transform (e.g., annotate, reformat, introduce a schema, etc.) status-update communications, and identify other data (e.g., an identifier of an assigning system and/or a time at which a communication was received) to associate with a status update (e.g., an assignment). Therefore, the DAM engine can be configured to prepare storage-update tasks so as to cause a maintained data store to reflect a recent data change.

Further, the DAM engine can facilitate handling of data-store queries. For example, a status-request communication or authorization-request communication can be processed to identify variables and/or indices to use to query a data store. A query can then be generated and/or directed to a data store based on the processing. The DAM engine can relay (e.g., and, potentially, perform intermediate processing to) a query result to a request-associate system.

The database engine can also include a conflict engine, which can be configured to access and implement rules indicating how conflicts are to be handled. For example, catalog system 342 may receive multiple requests within a time period requesting an assignment authorization (or a hold) for a particular access right. A rule may indicate that a first request is to receive priority, that a request associated with a more highly prioritized requesting system (e.g., intermediate system) is to be prioritized, that a request associated with a relatively high (or low) quantity of access rights identified in the request for potential assignment are to be prioritized, etc.

The database engine can further include a storage engine configured to manage data access and/or data updates (e.g., modifying existing data or adding new data). The data managed by and/or accessible to the storage engine can be included in one or more data stores. The data stores can include, for example, distributed, non-distributed, virtual, non-virtual, local and/or remote data stores. The data stores can include, for example, a relational, non-relational, object, non-object, document and/or non-document data store. Part or all of a data store can include a shadow data store, that shadows data from another data store. Part or all of a data store can include an authoritative data store that is (e.g., directly and/or immediately) updated with access-right assignment changes (e.g., such that a primary or secondary access assignment system updates the data store as part of an access-right assignment process, rather than sending a post-hoc status-update communication reflecting the assignment). In some instances, a data store an authoritative data store identifies a status for each of a set (e.g., or all) of access rights for a given resource. Should there be any inconsistency between an authoritative data store and another data store (e.g., at an intermediate system), system 300 can be configured such that the authoritative data store is controlling.

System 300 can further include a replication system 343. Replication system 343 can include one or more replication processors configured to identify new or modified data, to identify one or more data stores and/or location at which to store the new or modified data and/or to coordinate replication of the data. In some instances, one or more of these identifications and/or coordination can be performed using a replication rule. For example, a replication rule may indicate that replication is to be performed in a manner biased towards storing replicated data at a data store geographically separated from another data store storing the data.

A data duplicator can be configured to read stored data and generate one or more write commands so as to store the data at a different data store. A controller can manage transmitting write commands appropriately so as to facilitate storing replicated data at identified data stores. Further, a controller can manage data stores, such as a distributed memory or distributed shared memory, to ensure that a currently active set of data stores includes a target number of replications of data.

Accordingly, web-server system 318 can interact with user device 310 to identify available access rights and to collect information needed to assign an access right. Web-server system 318 can interact with SQL system 341 so as to retrieve data about particular resources and/or access rights so as to configure web data (e.g., via dynamic webpages or scripts) to reflect accurate or semi-accurate information and/or statuses. SQL system 341 can use relational data stores to quickly provide such data. Meanwhile, catalog system 342 may manage one or more non-relational and/or more comprehensive data stores may be tasked with more reliably and quickly tracking access-right statuses and assignments. The tracking may include receiving status updates (e.g., via a push or pull protocol) from one or more intermediate systems and/or by detecting assignment updates from non-intermediate systems, such as an integrated access assignment system and/or SQL system 341. Catalog system 342 may provide condensed status updates (e.g., reflecting a binary indication as to whether an access right is available) to SQL system 341 periodically, at triggered times and/or in response to a request from the SQL system. A replication system 343 can further ensure that data is replicated at multiple data stores, so as to improve a reliability and speed of system 300.

It will be appreciated that various parts of system 300 can be geographically separated. For example, each of user device 310, intermediate system 330, web-server system 318, SQL system 341, catalog system 342 and replication 343 may be located in different geographic locations (e.g., different cities, states or countries).

Figure 4:
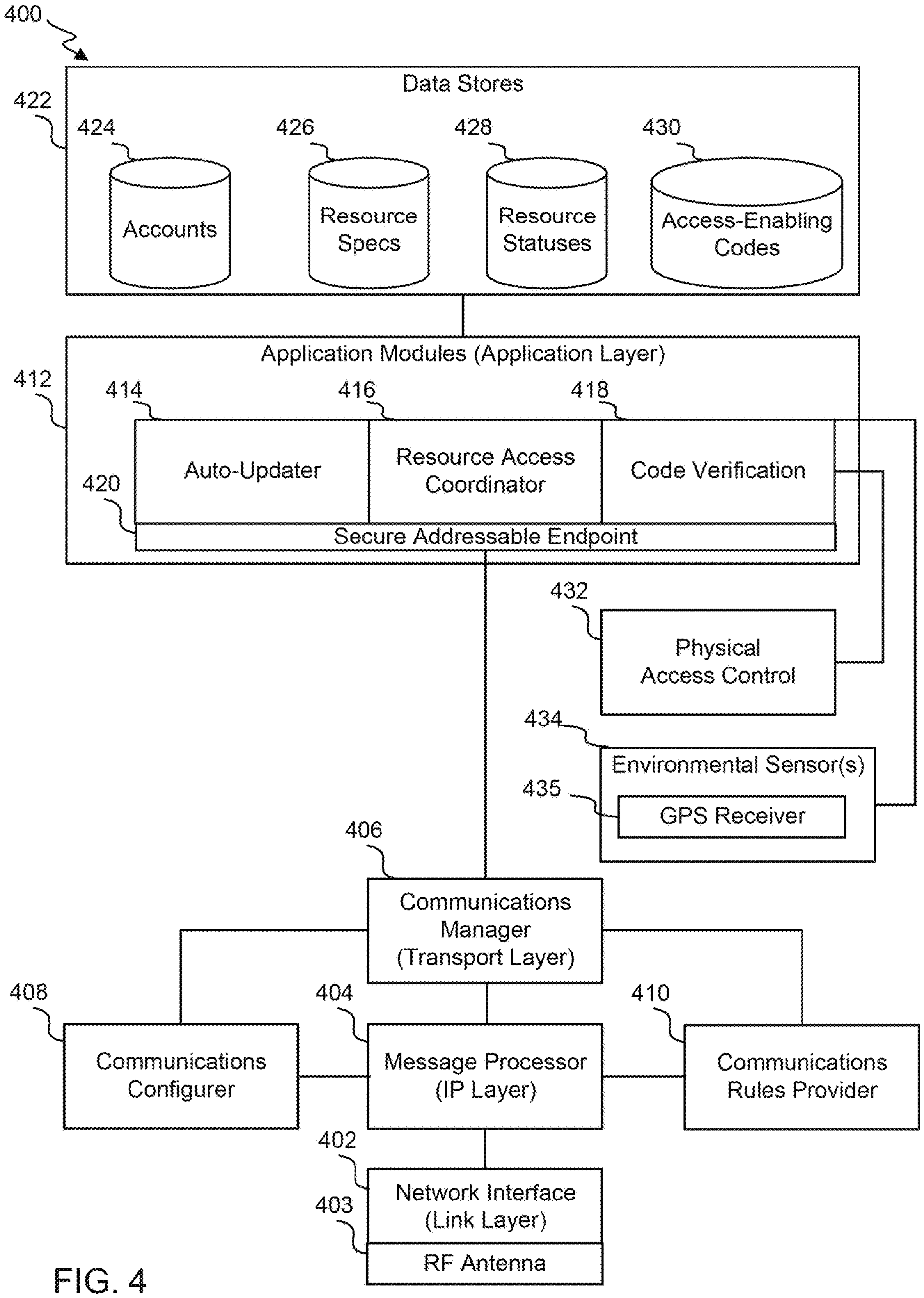
FIG. 4 illustrates example components of a device.

FIG. 4 illustrates example components of a device 400, such as a client device (e.g., client agent device 140, client register 150 and/or client point device 160), an intermediate system (e.g., intermediate system 130) and/or an access management system (e.g., access management system 120) according to an embodiment of the invention.

The components can include one or more modules that can be installed on device 400. Modules can include some or all of the following: a network interface module 402 (which can operate in a link layer of a protocol stack), a message processor module 404 (which can operate in an IP layer of a protocol stack), a communications manager module 406 (which can operate in a transport layer of a protocol stack), a communications configure module 408 (which can operate in a transport and/or IP layer in a protocol stack), a communications rules provider module 410 (which can operate in a transport and/or IP layer in a protocol stack), application modules 412 (which can operate in an application layer of a protocol stack), a physical access control module 432 and one or more environmental sensors 434.

Network interface module 402 receives and transmits messages via one or more hardware components that provide a link-layer interconnect. The hardware component(s) can include, for example, RF antenna 403 or a port (e.g., Ethernet port) and supporting circuitry. In some embodiments, network interface module 402 can be configured to support wireless communication, e.g., using Wi Fi (IEEE 802.11 family standards), Bluetooth® (a family of standards promulgated by Bluetooth SIG, Inc.), BLE, or near-field communication (implementing the ISO/IEC 18092 standards or the like).

RF antenna 403 can be configured to convert electric signals into radio and/or magnetic signals (e.g., to radio waves) to transmit to another device and/or to receive radio and/or magnetic signals and convert them to electric signals. RF antenna 403 can be tuned to operate within a particular frequency band. In some instances, a device includes multiple antennas, and the antennas can be, for example, physically separated. In some instances, antennas differ with respect to radiation patterns, polarizations, take-off angle gain and/or tuning bands. RF interface module 402 can include one or more phase shifters, filters, attenuators, amplifiers, switches and/or other components to demodulate received signals, coordinate signal transmission and/or facilitate high-quality signal transmission and receipt.

In some instances, network interface module 402 includes a virtual network interface, so as to enable the device to utilize an intermediate device for signal transmission or reception. For example, network interface module 402 can include VPN software.

Network interface module 402 and one or more antennas 403 can be configured to transmit and receive signals over one or more connection types. For example, network interface module 402 and one or more antennas 403 can be configured to transmit and receive WiFi signals, cellular signals, Bluetooth signals, Bluetooth Low Energy (BLE) signals, Zigbee signals, or Near-Field Communication (NFC) signals.

Message processor module 404 can coordinate communication with other electronic devices or systems, such as one or more servers or a user device. In one instance, message processor module 404 is able to communicate using a plurality of protocols (e.g., any known, future and/or convenient protocol such as, but not limited to, XML, SMS, MMS, and/or email, etc.). Message processor module 404 may further optionally serialize incoming and/or outgoing messages and facilitate queuing of incoming and outgoing message traffic.

Message processor module 404 can perform functions of an IP layer in a network protocol stack. For example, in some instances, message processor module 404 can format data packets or segments, combine data packet fragments, fragment data packets and/or identify destination applications and/or device addresses. For example, message processor module 404 can defragment and analyze an incoming message to determine whether it is to be forwarded to another device and, if so, can address and fragment the message before sending it to the network interface module 402 to be transmitted. As another example, message processor module 404 can defragment and analyze an incoming message to identify a destination application that is to receive the message and can then direct the message (e.g., via a transport layer) to the application.

Communications manager module 406 can implement transport-layer functions. For example, communications manager module 406 can identify a transport protocol for an outgoing message (e.g., transmission control protocol (TCP) or user diagram protocol (UDP)) and appropriately encapsulate the message into transport protocol data units. Message processor module 404 can initiate establishment of connections between devices, monitor transmissions failures, control data transmission rates and monitoring transmission quality. As another example, communications manager module 406 can read a header of an incoming message to identify an application layer protocol to receive the message's data. The data can be separated from the header and sent to the appropriate application. Message processor module 404 can also monitor the quality of incoming messages and/or detect out of order incoming packets.

In some instances, characteristics of message-receipt or message-transmission quality can be used to identify a health status of an established communications link. In some instances, communications manager module 406 can be configured to detect signals indicating the health status of an established communications link (e.g., a periodic signal from the other device system, which if received without dropouts, indicates a healthy link).

In some instances, a communication configurer module 408 is provided to track attributes of another system so as to facilitate establishment of a communication session. In one embodiment, communication configurer module 408 further ensures that inter-device communications are conducted in accordance with the identified communication attributes and/or rules. Communication configurer module 408 can maintain an updated record of the communication attributes of one or more devices or systems. In one embodiment, communications configurer module 408 ensures that communications manager module 406 can deliver the payload provided by message processor module 404 to the destination (e.g., by ensuring that the correct protocol corresponding to the client system is used).

A communications rules provider module 410 can implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule can identify a technique for selecting between a set of potential destination devices based on attributes of the set of potential destination devices as tracked by communication configure module 408. To illustrate, a device having a short response latency may be selected as a destination device. As another example, communications rules provider 410 can maintain associations between various devices or systems and resources. Thus, messages corresponding to particular resources can be selectively transmitted to destinations having access to such resources.

A variety of application modules 412 can be configured to initiate message transmission, process incoming transmissions, facilitate selective granting of resource access, facilitate processing of requests for resource access, and/or performing other functions. In the instance depicted in FIG. 4, application modules 412 include an auto-updater module 414, a resource access coordinator module 416, and/or a code verification module 418.

Auto-updater module 414 automatically updates stored data and/or agent software based on recent changes to resource utilization, availability or schedules and/or updates to software or protocols. Such updates can be pushed from another device (e.g., upon detecting a change in a resource availability or access permit) or can be received in response to a request sent by device 400. For example, device 400 can transmit a signal to another device that identifies a particular resource, and a responsive signal can identify availabilities of access to the resource. As another example, device 400 can transmit a signal that includes an access access-enabling code, and a responsive signal can indicate whether the code is applicable for access of a particular resource and/or is valid.

In some instances, auto-updater module 414 is configured to enable the agent software to understand new, messages, commands, and/or protocols, based on a system configuration/change initiated on another device. Auto-updater module 414 may also install new or updated software to provide support and/or enhancements, based on a system configuration change detected on device 400. System configuration changes that would necessitate changes to the agent software can include, but are not limited to, a software/hardware upgrade, a security upgrade, a router configuration change, a change in security settings, etc. For example, if auto-updater module 414 determines that a communication link with another device has been lost for a pre-determined amount of time, auto-updater module 414 can obtain system configuration information to help re-establish the communication link. Such information may include new settings/configurations on one or more hardware devices or new or upgraded software on or connected to device 400. Thus, auto-updater module 414 can detect or be informed by other software when there is a new version of agent software with additional functionality and/or deficiency/bug corrections or when there is a change with respect to the software, hardware, communications channel, etc.), and perform updates accordingly.

Based on the newly obtained system configuration for device 400, auto-updater module 414 can cause a new communication link to be re-established with another device. In one embodiment, upon establishment of the communication link, system configuration information about device 400 can also be provided to another device to facilitate the connection to or downloading of software to device 400.

In one embodiment, when a poor health signal is detected by another device (e.g., when the health signal is only sporadically received but the communication link is not necessarily lost), the other device can send a command to auto-updater module 414 to instruct auto-updater module 414 to obtain system configuration information about device 400. The updated system configuration information may be used in an attempt to revive the unhealthy communications link (e.g., by resending a resource request). For example, code can utilize appropriate system calls for the operating system to fix or reestablish communications. By way of example and not limitation, model and driver information is optionally obtained for routers in the system in order querying them. By way of further example, if the code determines that a new brand of router has been installed, it can adapt to that change, or to the change in network configuration, or other changes.

Instead or in addition, the host server (e.g., via communications manager 406) can send specific instructions to auto-updater module 414 to specify tests or checks to be performed on device 400 to determine the changes to the system configurations (e.g., by automatically performing or requesting a check of system hardware and/or software). For example, the components involved in the chain of hops through a network can be queried and analyzed. Thus, for example, if a new ISP (Internet service provider) is being used and the management system traffic is being filtered, or a new router was installed and the software needs to change its configuration, or if someone made a change to the operating system that affects port the management system is using to communicate, the management system (or operator) can communicate with the ISP, change it back, or choose from a new available port, respectively.

The specific tests may be necessary to help establish the communication link, if, for example, the automatic tests fail to provide sufficient information for the communication link to be re-established, if additional information is needed about a particular configuration change, and/or if the client system is not initially supported by the auto-updater module 414, etc.

Auto-updater module 414 can also receive signals identifying updates pertaining to current or future availability of resources and/or access permits. Based on the signals, auto-updater module 414 can modify, add to or delete stored data pertaining to resource availabilities, resource schedules and/or valid access permits. For example, upon receiving an update signal, auto-updater 414 can modify data stored in one or more data stores 422, such as a profile data store 424, resource specification data store 426, resource status data store 428 and/or access-enabling code data store 430.

Profile data store 424 can store data for entities, such as administrators, intermediate-system agents and/or users. The profile data can include login information (e.g., username and password), identifying information (e.g., name, residential address, phone number, email address, age and/or gender), professional information (e.g., occupation, affiliation and/or professional position), and preferences (e.g., regarding resource types, entities, access right locations, and/or resource types). The profile data can also or alternatively include technical data, such a particular entity can be associated with one or more device types, IP addresses, browser identifier and/or operating system identifier).

Resource specification data store 426 can store specification data characterizing each of one or more resources. For example, specification data for a resource can include a processing power, available memory, operating system, compatibility, device type, processor usage, power status, device model, number of processor cores, types of memories, date and time of availability, a resource entity, and/or a spatial region of the resource. Specification data can further identify, for example, a cost for each of one or more access rights.

Resource status data store 428 can store status data reflecting which resources are available (or unavailable), thereby indicating which resources have one or more open assignments. In some instances, the status data can include schedule information about when a resource is available. Status data can include information identifying an entity who requested, automatically and/or tentatively assigned or was assigned a resource. In some instances, status information can indicate that a resource is being held or automatically and/or tentatively assigned and may identify an entity associated with the hold and/or a time at which the hold or reservation will be enabled to be queried.

Access-enabling code data store 430 can store access-enabling code data that includes one or more codes and/or other information that can be used to indicate that an entity is authorized to use, have or receive a resource. An access-enabling code can include, for example, a numeric string, an alphanumeric string, a text string, a 1-dimensional code, a 2-dimensional code, a access code, a quick response (QR) code, an image, a static code and/or a temporally dynamic code. An access-enabling code can be, for example, unique across all instances, resource types and/or entities. For example, access-enabling codes provided in association for access rights to a particular resource can be unique relative to each other. In some instances, at least part of a code identifies a resource or specification of a resource.

One or more of data stores 424, 426, 428, and 430 can be a relational data store, such that elements in one data store can be referenced within another data store. For example, resource status data store 428 can associate an identifier of a particular access right with an identifier of a particular entity. Additional information about the entity can then be retrieved by looking up the entity identifier in profile data store 424.

Updates to data stores 424, 426, 428, and 430 facilitated and/or initiated by auto-updater module 414 can improve cross-device data consistency. Resource access coordinator module 416 can coordinate resource access by, for example, generating and distributing identifications of resource availabilities; processing requests for resource access; handling competing requests for resource access; and/or receiving and responding to resource-offering objectives.

Figure 5:
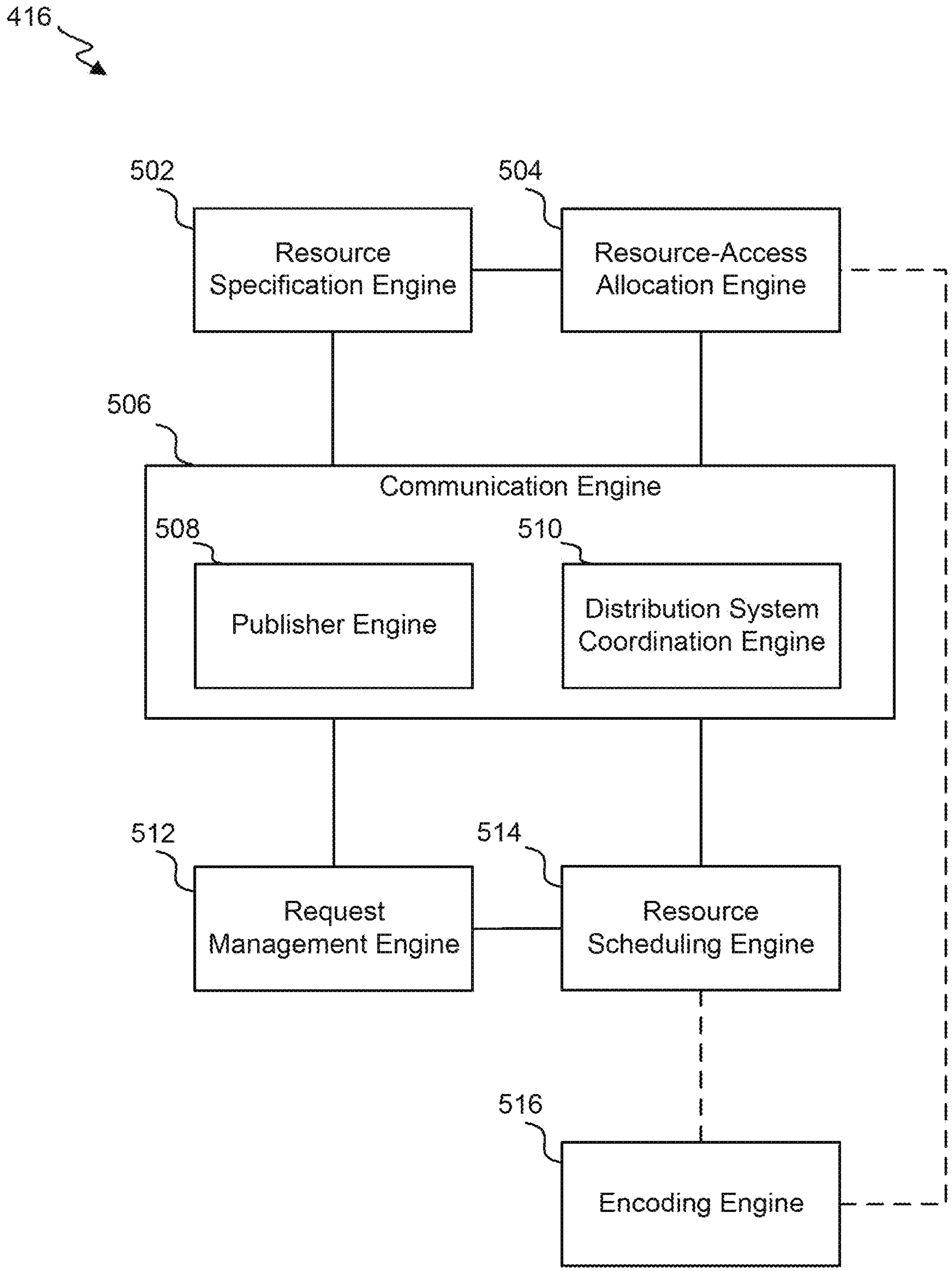
FIG. 5 illustrates example components of resource access coordinator module.

FIG. 5 illustrates example components of resource access coordinator module 416 that may operate, at least in part, at an access management system (e.g., access management system) according to an embodiment of the present disclosure. A resource specification engine 502 can identify one or more available resources. For example, resource specification engine 502 can detect input that identifies a current or future availability of a new resource.

Resource specification engine 502 can identify one or more specifications of each of one or more resources. A specification can include an availability time period. For example, resource specification engine 502 can determine that a resource is available, for example, at a particular date and time (e.g., as identified based on input), for a time period (e.g., a start to end time), as identified in the input, and/or from a time of initial identification until another input indicating that the resource is unavailable is detected. A specification can also or alternatively include a location (e.g., a geographic location and/or spatial region) of the resource. A specification can also or alternatively include one or more parties associated with the resource. Resource specification engine 502 can store the specifications in association with an identifier of the resource in resource specifications data store 426.

A resource-access allocation engine 504 can allocate access rights for individual resources. An access right can serve to provide an associated entity with the right or a priority to access a resource. Because (for example) association of an access right with an entity can, in some instances, be conditioned on one or more steps of an assignment process or authorization thereof, an allocated access right can be initially unassociated with particular entities (e.g., users). For example, an allocated right can correspond to one or more access characteristics, such as an processor identifier, a usage time, a memory allocation, and/or a geographic location. For an allocated access right, resource-access allocation engine 504 can store an identifier of the right in resource statuses data store 428 in association with an identifier for the resource and an indication that it has not yet been assigned to a particular entity.

A communication engine 506 can facilitate communicating the availability of the resource access rights to users. In some instances, a publisher engine 508 generates a presentation that identifies a resource and indicates that access rights are available. Initially or in response to user interaction with the presentation, the presentation can identify access characteristics about available access rights. The presentation can include, for example, a chart that identifies available access rights for an event. Publisher engine 508 can distribute the presentation via, for example, a website, app page, email and/or message. The presentation can be further configured to enable a user to request assignments of one or more access rights.

In some instances, an intermediate system coordination engine 510 can facilitate transmission of information about resource availability (e.g., resource specifications and characteristics of resource-access rights) to one or more intermediate systems (e.g., by generating one or more messages that include such information and/or facilitating publishing such information via a website or app page). Each of the one or more intermediate systems can publish information about the resource and accept requests for resource access. In some instances, intermediate system coordination engine 510 identifies different access rights as being available to individual intermediate systems to coordinate assignment. For example, access rights for Section 1 may be provided for a first intermediate system to assign, and access rights for Section 2 may be provided to a second intermediate system to assign.

In some instances, overlapping access rights are made available to multiple intermediate systems to coordinate assignments. For example, some or all of a first set of resource rights (e.g., corresponding to a section) may be provided to first and second intermediate systems. In such instances, intermediate system coordination engine 510 can respond to a communication from a first intermediate system indicating that a request has been received (e.g., and processed) for an access right in the set) by sending a notification to one or more other intermediate systems that indicates that the access right is to be at least temporarily (or entirely) made unavailable.

Intermediate system coordination engine 510 can monitor communication channels with intermediate systems to track the health and security of the channel. For example, a healthy connection can be inferred when scheduled signals are consistently received. Further, intermediate system coordination engine 510 can track configurations of intermediate systems (e.g., via communications generated at the intermediate systems via a software agent that identifies such configurations) so as to influence code generation, communication format, and/or provisions or access rights.

Thus, either via a presentation facilitated by publisher engine 508 (e.g., via a web site or app page) or via communication with an intermediate system, a request for assignment of an access right can be received. A request management engine 512 can process the request. Processing the request can include determining whether all other required information has been received, such as user-identifying information (e.g., name), access-right identifying information (e.g., identifying a resource and/or access-right characteristic) user contact information, and/or user device information (e.g., type of device, device identifier, and/or IP address).

When all required information has not been received, request management engine 512 can facilitate collection of the information (e.g., via an interface, app page or communication to an intermediate system). Request management engine 512 can also or alternatively execute or facilitate the execution of the assignment process, which includes one or more steps for completing an assignment of an access right to a user device or user profile. For example, publisher engine 508 may receive data inputted by the user via an interface, and request management engine 512 can request authorization to complete the assignment process. In some instances, request management engine 512 retrieves data from a user profile. For example, publisher engine 508 may indicate that a request for an access right has been received while a user was logged into a particular profile. Request management engine 512 may then retrieve, for example, contact information, device information, and/or preferences information associated with the profile from profile data store 424.

In some instances, request management engine 512 prioritizes requests, such as requests for overlapping, similar or same access rights received within a defined time period. The prioritization can be based on, for example, times at which requests were received (e.g., prioritizing earlier requests), a request parameter (e.g., prioritizing requests for a higher or lower number of access rights above others), whether requests were received via an intermediate system (e.g., prioritizing such requests lower than others), intermediate systems associated with requests, whether requests were associated with users having established profiles, and/or whether requests were associated with inputs indicative of a bot initiating the request (e.g., shorter inter-click intervals, failed CAPTCHA tests).

Upon determining that required information has been received and request-processing conditions have been met, request management engine 512 can forward appropriate request information to a resource scheduling engine 514. For a request, resource scheduling engine 514 can query resource status data store 428 to identify access rights matching parameters of the request.

In some instances, the request has an access-right specificity matching a specificity at which access rights are assigned. In some instances, the request is less specific, and resource scheduling engine 514 can then facilitate an identification of particular rights to assign. For example, request management engine 512 can facilitate a communication exchange by which access right characteristics matching the request are identified, and a user is allowed to select particular rights. As another example, request management engine 512 can itself select from amongst matching access rights based on a defined criterion (e.g., best summed or averaged access-right ranking, pseudo-random selection, or a selection technique identified based on user input).

Upon identifying appropriately specific access rights, resource scheduling engine 514 can update resource status data store 428 so as to place the access right(s) on hold (e.g., while obtaining user confirmation) and/or to change a status of the access right(s) to indicate that they have been assigned (e.g., immediately, upon completing an assignment process or upon receiving user confirmation). Such assignment indication may associate information about the user (e.g., user name, device information, phone number and/or email address) and/or assignment process (e.g., identifier of any intermediate system and/or assignment date and time) with an identifier of the access right(s).

For individual assigned access rights, an encoding engine 516 can generate an access-enabling code. The access-enabling code can include, for example, an alphanumeric string, a text string, a number, a graphic, a code (e.g., a 1-dimensional or 2-dimensional code), a static code, a dynamic code (e.g., with a feature depending on a current time, current location or communication) and/or a technique for generating the code (e.g., whereby part of the code may be static and part of the code may be determined using the technique). The code may be unique across all access rights, all access rights for a given resource, all access rights associated with a given location, all access rights associated with a given time period, all resources and/or all users. In some instances, at least part of the code is determined based on or is thereafter associated with an identifier of a user, user device information, a resource specification and/or an access right characteristic.

In various embodiments, the code may be generated prior to allocating access rights (e.g., such that each of some or all allocated access rights are associated with an access-enabling code), prior to or while assigning one or more access right(s) responsive to a request (e.g., such that each of some or all assigned access rights are associated with an access-enabling code), at a prescribed time, and/or when the device is at a defined location and/or in response to user input. The code may be stored at or availed to a user device. In various instances, at the user device, an access-enabling code may be provided in a manner such that it is visibly available for user inspection or concealed from a user. For example, a physical manifestation of an access right may be a document with an access code, and a copy of this document may be transmitted to a user device, or an app on the user device can transmit a request with a device identifier for a dynamic code.

Encoding engine 516 can store the access-enabling codes in access-enabling code data store 430. Encoding engine 516 can also or alternatively store an indication in profile data store 424 that the access right(s) have been assigned to the user. It will again be appreciated that data stores 424, 426, 428, and 430 can be relational and/or linked, such that, for example, an identification of an assignment can be used to identify one or more access rights, associated access-enabling code(s) and/or resource specifications.

Resource scheduling engine 514 can facilitate one or more transmissions of data pertaining to one or more assigned access rights to a device of a user associated with the assignment and/or to an intermediate system facilitating the assignment and/or having transmitted a corresponding assignment request. The data can include an indication that access rights have been assigned and/or details as to which rights have been assigned. The data can also or alternatively include access-enabling codes associated with assigned access rights.

While FIG. 5 depicts components of resource access coordinator module 516 that may be present on an access management system 120, it will be appreciated that similar or complementary engines may be present on other systems. For example, a communication engine on a user device can be configured to display presentations identifying access right availability, and a request management engine on a user device can be configured to translate inputs into access-right requests to send to an intermediate system or access management system.

Returning to FIG. 4, code verification module 418 (e.g., at a user device or client device) can analyze data to determine whether an access-enabling code is generally valid and/or valid for a particular circumstance. The access-enabling code can include one that is received at or detected by device 400. The analysis can include, for example, determining whether all or part of the access-enabling code matches one stored in access-enabling code data store 430 or part thereof, whether the access-enabling code has previously been applied, whether all or part of the access-enabling code is consistent with itself or other information (e.g., one or more particular resource specifications, a current time and/or a detected location) as determined based on a consistency analysis and/or whether all or part of the access-enabling code has an acceptable format.

For example, access-enabling code data store 430 can be organized in a manner such that access-enabling codes for a particular resource, date, resource group, client, etc. can be queried to determine whether any such access-enabling codes correspond to (e.g., match) one being evaluated, which may indicate that the code is verified. Additional information associated with the code may also or alternatively be evaluated. For example, the additional information can indicate whether the code is currently valid or expired (e.g., due to a previous use of the code).

As another example, a portion of an access-enabling code can include an identifier of a user device or user profile, and code verification module 418 can determine whether the code-identified device or profile matches that detected as part of the evaluation. To illustrate, device 400 can be a client device that electronically receives a communication with an access-enabling code from a user device. The communication can further include a device identifier that identifies, for example, that the user device is a particular type of smartphone. Code verification module 418 can then determine whether device-identifying information in the code is consistent with the identified type of smartphone.

As yet another example, code verification module 418 can identify a code format rule that specifies a format that valid codes are to have. To illustrate, the code format rule may identify a number of elements that are to be included in the code or a pattern that is to be present in the code. Code verification module 418 can then determine that a code is not valid if it does not conform to the format.

Verification of an access-enabling code can indicate that access to a resource is to be granted. Conversely, determining that a code is not verified can indicate that access to a resource is to be limited or prevented. In some instances, a presentation is generated (e.g., and presented) that indicates whether access is to be granted and/or a result of a verification analysis. In some instances, access granting and/or limiting is automatically affected. For example, upon a code verification, a user device and/or user may be automatically permitted to access a particular resource. Accessing a resource may include, for example, using a computational resource, possessing an item, receiving a service, entering a geographical area, and/or attending an event (e.g., generally or at a particular location).

Verification of an access-enabling code can further trigger a modification to access-enabling code data store 430. For example, a code that has been verified can be removed from the data store or associated with a new status. This modification may limit attempts to use a same code multiple times for resource access.

A combination of modules 414, 416, 418 comprise a secure addressable endpoint agent 420 that acts as an adapter and enables cross-device interfacing in a secure and reliable manner so as to facilitate allocation of access-enabling codes and coordinate resource access. Secure addressable endpoint agent 420 can further generate a health signal that is transmitted to another device for monitoring of a status of a communication channel. The health signal is optionally a short message of a few bytes or many bytes in length that may be transmitted on a frequent basis (e.g., every few milliseconds or seconds). A communications manager 406 on the receiving device can then monitors the health signal provided by the agent to ensure that the communication link between the host server and device 400 is still operational.

In some instances, device 400 can include (or can be in communication with) a physical access control 432. Physical access control 432 can include a gating component that can be configured to provide a physical barrier towards accessing a resource. For example, physical access control 432 can include a turnstile or a packaging lock.

Physical access control 432 can be configured such that it can switch between two modes, which differ in terms of a degree to which user access to a resource is permitted. For example, a turnstile may have a locked mode that prevents movement of an arm of the turnstile and an unlocked mode that allows the arm to be rotated. In some instances, a default mode is the mode that is more limiting in terms of access.

Physical access control 432 can switch its mode in response to receiving particular results from code verification module 418. For example, upon receiving an indication that a code has been verified, physical access control 432 can switch from a locked mode to an unlocked mode. It may remain in the changed state for a defined period of time or until an action or event is detected (e.g., rotation of an arm).

Device 400 can also include one or more environmental sensors 434. Measurements from the sensor can processed by one or more application modules. Environmental sensor(s) 434 can include a global positioning system (GPS) receiver 435 that can receive signals from one or more GPS satellites. A GPS chipset can use the signals to estimate a location of device 400 (e.g., a longitude and latitude of device 400). The estimated location can be used to identify a particular resource (e.g., one being offered at or near the location at a current or near-term time). The identification of the particular resource can be used, for example, to identify a corresponding (e.g., user-associated) access-enabling code or to evaluate an access-enabling code (e.g., to determine whether it corresponds to a resource associated with the location).

The estimated location can further or alternatively be used to determine when to perform a particular function. For example, at a user device, detecting that the device is in or has entered a particular geographical region (e.g., is within a threshold distance from a geofence perimeter or entrance gate) can cause the device to retrieve or request an access-enabling code, conduct a verification analysis of the code and/or transmit the code to a client device.

It will be appreciated that environmental sensor(s) 434 can include one or more additional or alternative sensors aside from GPS receiver 435. For example, a location of device 400 can be estimated based on signals received by another receive from different sources (e.g., base stations, client point devices or Wi Fi access points). As another example, an accelerometer and/or gyroscope can be provided. Data from these sensors can be used to infer when a user is attempting to present an access-enabling code for evaluation.

It will also be appreciated that the components and/or engines depicted in figures herein are illustrative, and a device need not include each depicted component and/or engine and/or can include one or more additional components and/or engines. For example, a device can also include a user interface, which may include a touch sensor, keyboard, display, camera and/or speakers. As another example, a device can include a power component, which can distribute power to components of the device. The power component can include a battery and/or a connection component for connecting to a power source. As yet another example, a module in the application layer can include an operating system. As still another example, an application-layer control processor module can provide message processing for messages received from another device. The message processing can include classifying the message and routing it to the appropriate module. To illustrate, the message can be classified as a request for resource access or for an access-enabling code, an update message or an indication that a code has been redeemed or verified. The message processing module can further convert a message or command into a format that can interoperate with a target module.

It will further be appreciated that the components, modules and/or agents could be implemented in one or more instances of software. The functionalities described herein need not be implemented in separate modules, for example, one or more functions can be implemented in one software instance and/or one software/hardware combination. Other combinations are similarly be contemplated.

Further yet, it will be appreciated that a storage medium (e.g., using magnetic storage media, flash memory, other semiconductor memory (e.g., DRAM, SRAM), or any other non-transitory storage medium, or a combination of media, and can include volatile and/or non-volatile media) can be used to store program code for each of one or more of the components, modules and/or engines depicted in FIGS. 4 and 5 and/or to store any or all data stores depicted in FIG. 4 or described with reference to FIGS. 4 and/or 5. Any device or system disclosed herein can include a processing subsystem for executing the code. The processing system can be implemented as one or more integrated circuits, e.g., one or more single-core or multi-core microprocessors or microcontrollers, examples of which are known in the art.

Figure 6:
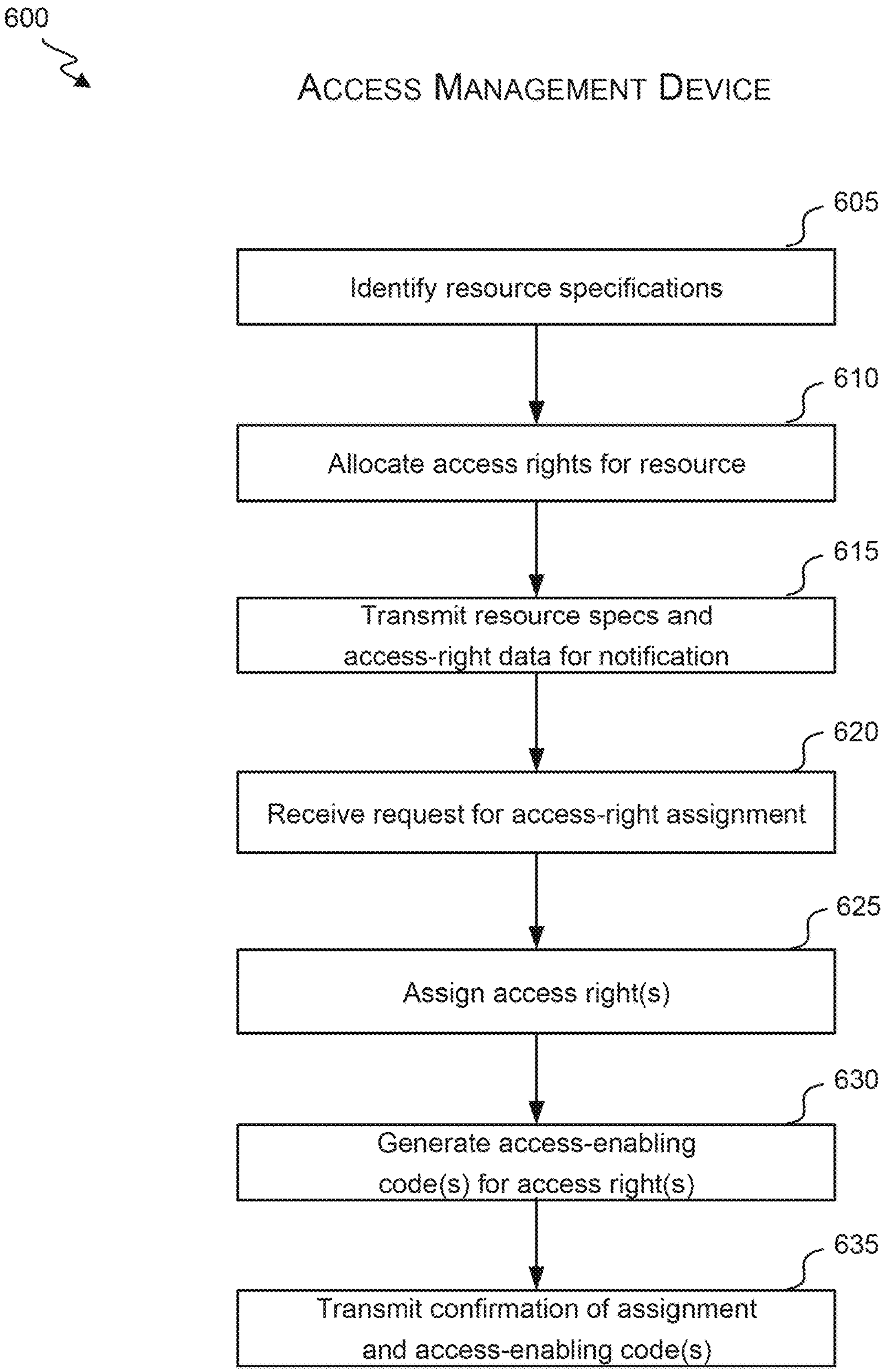
FIG. 6 illustrates a flowchart of an embodiment of a process for assigning access rights for resources.

FIG. 6 illustrates a flowchart of an embodiment of a process 600 for assigning access rights for resources. Process 600 can be performed by an access management system, such as access management system 120. Process 600 begins at block 605 where resource specification engine 502 identifies one or more specifications for a resource. The specifications can include, for example, a time at which the resource is to be available, a location of the resource, a capacity of the resources and/or one or more entities (e.g., performing entities) associated with the resource.

At block 610, resource-access allocation engine 504 allocates a set of access rights for the resource. In some instances, each of at least some of the access rights corresponds to a different access parameter, such as a different location assignment. Upon allocation, each of some or all of the access rights may have a status as available. A subset of the set of access rights can be immediately (or at a defined time) assigned or reserved according to a base assignment or reservation rule (e.g., assigning particular access rights to particular entities, who may be involved in or related to provision of the resource and/or who have requested or been assigned a set of related access rights.

At block 615, communication engine 506 transmits the resource specifications and data about the access rights. The transmission can occur in one or more transmissions. The transmission can be to, for example, one or more user devices and/or intermediate systems. In some instances, a notification including the specifications and access-right data is transmitted, and in some instances, a notification can be generated at a receiving device based on the specifications and access-right data. The notification can include, for example, a website that identifies a resource (via, at least in part, its specifications) and indicates that access rights for the resource are available for assignment. The notification can include an option to request assignment of one or more access rights.

At block 620, request management engine 512 receives a request for one or more access rights to be assigned to a user. The request can, for example, identify particular access rights and/or access parameters. The request can include or be accompanied by other information, such as identifying information. In some instances, the access management system can use at least some of such information to determine whether an assignment process has been completed. In some instances, the request is received via an intermediate system that has already handled such authorization.

At block 625, resource scheduling engine 514 assigns the requested one or more access rights to the user. The assignment can be conditioned on receipt of all required information, confirmation that the access right(s) have remained available for assignment, determining using data corresponding to the request that a bot-detection condition is not satisfied and/or other defined conditions. Assignment of the access right(s) can include associating an identifier of each of the one or more rights with an identifier of a user and/or assignment and/or changing a status of the access right(s) to assigned. Assignment of the access right(s) can result in impeding or preventing other users from requesting the access right(s), being assigned the access right(s) and/or being notified that the access right(s) are available for assignment. Assignment of the access right(s) can, in some instances, trigger transmission of one or more communications to, for example, one or more intermediate systems identifying the access right(s) and indicating that they have been assigned and/or with an instruction to cease offering the access rights.

At block 630, encoding engine 516 generates an access-enabling code for each of the one or more access rights. The code can be generated, for example, as part of the assignment, as part of the allocation or subsequent to the assignment (e.g., upon detecting that a user is requesting access to the resource). Generating an access-enabling code can include applying a code-generation technique, such on one that generates a code based on a characteristic of a user, user device, current time, access right, resource, intermediate system or other variable. The access-enabling code can include a static code that will not change after it has been initially generated or a dynamic code that changes in time (e.g., such that block 630 can be repeated at various time points).

At block 635, communication engine 506 transmits a confirmation of the assignment and the access-enabling code(s) in one or more transmissions. The transmission(s) may be sent to one or more devices, such as a user device having initiated the request from block 620, a remote server or an intermediate system having relayed the request from block 620.

Figure 7A:
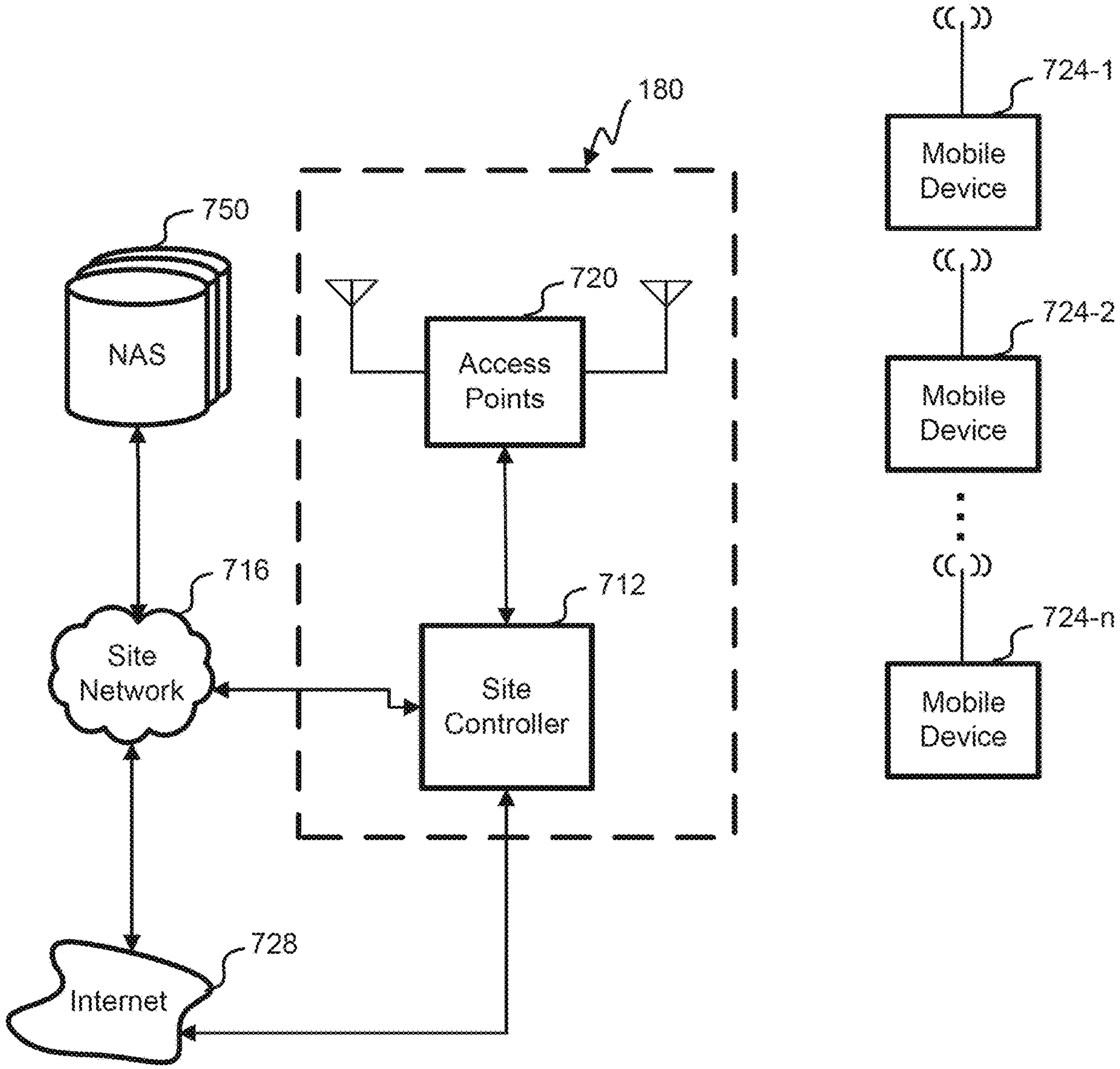
FIGS. 7A and 7B show embodiments of site systems in relations to mobile devices.

Referring to FIG. 7A, an embodiment of a site system 180 is shown in relation to mobile devices 724-*n*, Network Attached Storage (NAS) 750, site network 716 and the Internet 728. In some embodiments, for users located within the spatial region of the resource, site network 716 and site system 180 provide content, services and/or interactive engagement using mobile devices 724. Connections to site system 180 and site network 716 can be established by mobile devices 724 connecting to access points 720. Mobile devices 724 can be a type of end user device 110 that is portable, e.g., smartphones, mobile phones, tablets, and/or other similar devices.

Site network 716 can have access to content (information about the resource, videos, images, etc.) held by NAS 750. Additionally, as described herein, content can be gathered from users both before and during the time period the resource is accessible. By connecting to site network 716, mobile device 724 can send content for use by site system 180 or display content received from NAS 750.

Figure 7B:
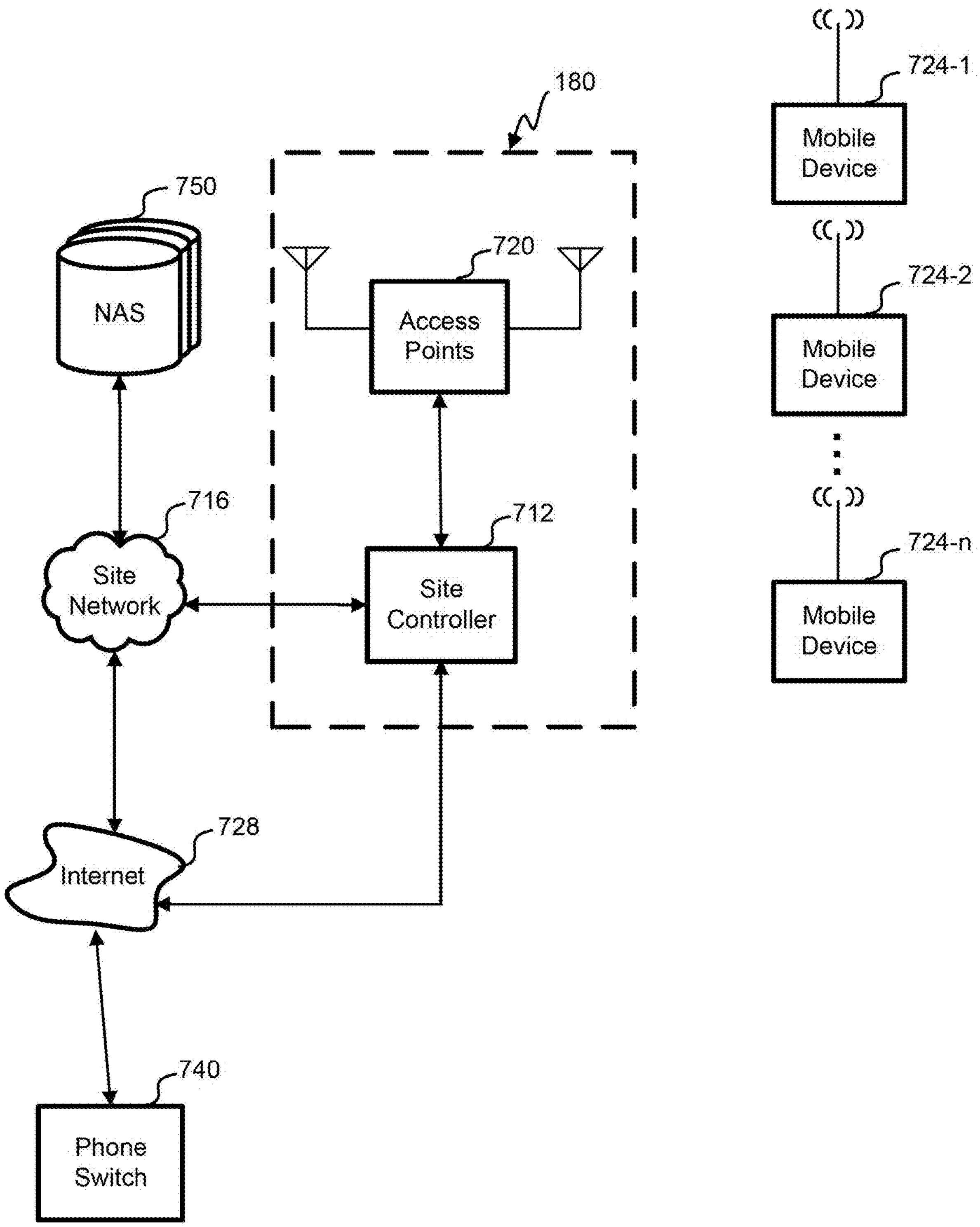

Referring to FIG. 7B, another embodiment of a site system 180 is shown in relation to mobile devices 724-*n*, Network Attached Storage (NAS) 750, site network 716 and the Internet 728, in an embodiment. FIG. 7B additionally includes phone switch 740. In some embodiments, phone switch 740 can be a private cellular base station configured to spoof the operation of conventionally operated base stations. Using phone switch 740 at an event site allows site system 180 to provide additional types of interactions with mobile devices 724. For example, without any setup or configuration to accept communications from site controller 712, phone switch 740 can cause connected mobile devices 724 to ring and, when answered, have an audio or video call be established. When used with other embodiments described herein, phone switch 740 can provide additional interactions. For example, some embodiments described herein use different capabilities of mobile devices 724 to cause mass sounds and/or establish communications with two or more people. By causing phones to ring and by establishing cellular calls, phone switch can provide additional capabilities to these approaches.

Figure 8:
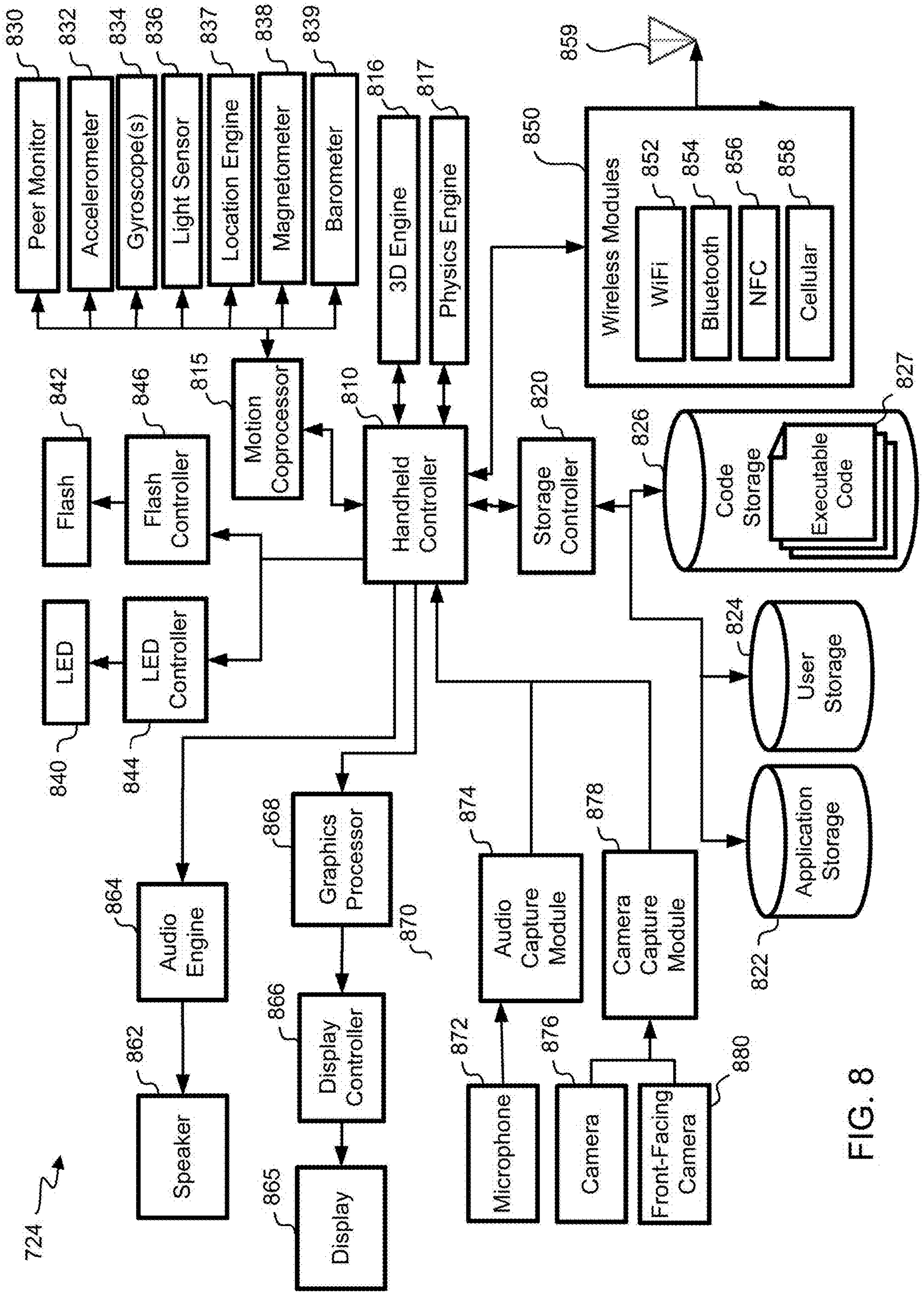
FIG. 8 shows a block diagram of user device according to an embodiment.

FIG. 8 shows a block diagram of user device 110 according to an embodiment. User device 110 includes a handheld controller 810 that can be sized and shaped so as enable the controller and user device 110 in a hand. Handheld controller 810 can include one or more user-device processors that can be configured to perform actions as described herein. In some instances, such actions can include retrieving and implementing a rule, retrieving an access-enabling code, generating a communication (e.g., including an access-enabling code) to be transmitted to another device (e.g., a nearby client-associated device, a remote device, a central server, a web server, etc.), processing a received communication (e.g., to perform an action in accordance with an instruction in the communication, to generate a presentation based on data in the communication, or to generate a response communication that includes data requested in the received communication) and so on.

Handheld controller 810 can communicate with a storage controller 820 so as to facilitate local storage and/or retrieval of data. It will be appreciated that handheld controller 810 can further facilitate storage and/or retrieval of data at a remote source via generation of communications including the data (e.g., with a storage instruction) and/or requesting particular data.

Storage controller 820 can be configured to write and/or read data from one or more data stores, such as an application storage 822 and/or a user storage 824. The one or more data stores can include, for example, a random access memory (RAM), dynamic random access memory (DRAM), read-only memory (ROM), flash-ROM, cache, storage chip, and/or removable memory. Application storage 822 can include various types of application data for each of one or more applications loaded (e.g., downloaded or pre-installed) onto user device 110. For example, application data can include application code, settings, profile data, databases, session data, history, cookies and/or cache data. User storage 824 can include, for example, files, documents, images, videos, voice recordings and/or audio. It will be appreciated that user device 110 can also include other types of storage and/or stored data, such as code, files and data for an operating system configured for execution on user device 110.

Handheld controller 810 can also receive and process (e.g., in accordance with code or instructions generated in correspondence to a particular application) data from one or more sensors and/or detection engines. The one or more sensors and/or detection engines can be configured to, for example, detect a presence, intensity and/or identify of (for example) another device (e.g., a nearby device or device detectable over a particular type of network, such as a Bluetooth, Bluetooth Low-Energy or Near-Field Communication network); an environmental, external stimulus (e.g., temperature, water, light, motion or humidity); an internal stimulus (e.g., temperature); a device performance (e.g., processor or memory usage); and/or a network connection (e.g., to indicate whether a particular type of connection is available, a network strength and/or a network reliability).

FIG. 8 shows several exemplary sensors and detection engines, including a peer monitor 830, accelerometer 832, gyroscope 834, light sensor 836 and location engine 838. Each sensor and/or detection engine can be configured to collect a measurement or make a determination, for example, at routine intervals or times and/or upon receiving a corresponding request (e.g., from a processor executing an application code).

Peer monitor 830 can monitor communications, networks, radio signals, short-range signals, etc., which can be received by a receiver of user device 110) Peer monitor 830 can, for example, detect a short-range communication from another device and/or use a network multicast or broadcast to request identification of nearby devices. Upon or while detecting another device, peer monitor 830 can determine an identifier, device type, associated user, network capabilities, operating system and/or authorization associated with the device. Peer monitor 530 can maintain and update a data structure to store a location, identifier and/or characteristic of each of one or more nearby user devices.

Accelerometer 832 can be configured to detect a proper acceleration of user device 110. The acceleration may include multiple components associated with various axes and/or a total acceleration. Gyroscope 834 can be configured to detect one or more orientations (e.g., via detection of angular velocity) of user device 110. Gyroscope 834 can include, for example, one or more spinning wheels or discs, single- or multi-axis (e.g., three-axis) MEMS-based gyroscopes.

Light sensor 836 can include, for example, a photosensor, such as photodiode, active-pixel sensor, LED, photoresistor, or other component configured to detect a presence, intensity and/or type of light. In some instances, the one or more sensors and detection engines can include a motion detector, which can be configured to detect motion. Such motion detection can include processing data from one or more light sensors (e.g., and performing a temporal and/or differential analysis).

Location engine 838 can be configured to detect (e.g., estimate) a location of user device 110. For example, location engine 838 can be configured to process signals (e.g., a wireless signal, GPS satellite signal, cell-tower signal, iBeacon, or base-station signal) received at one or more receivers (e.g., a wireless-signal receiver and/or GPS receiver) from a source (e.g., a GPS satellite, cellular tower or base station, or WiFi access point) at a defined or identifiable location. In some instances, location engine 838 can process signals from multiple sources and can estimate a location of user device 110 using a triangulation technique. In some instances, location engine 838 can process a single signal and estimate its location as being the same as a location of a source of the signal.

User device 110 can include a flash 842 and flash controller 846. Flash 842 can include a light source, such as (for example), an LED, electronic flash or high-speed flash. Flash controller 846 can be configured to control when flash 842 emits light. In some instances, the determination includes identifying an ambient light level (e.g., via data received from light sensor 836) and determining that flash 842 is to emit light in response to a picture- or movieinitiating input when the light level is below a defined threshold (e.g., when a setting is in an auto-flash mode). In some additional or alternative instances, the determination includes determining that flash 846 is, or is not, to emit light in accordance with a flash on/off setting. When it is determined that flash 846 is to emit light, flash controller 846 can be configured to control a timing of the light so as to coincide, for example, with a time (or right before) at which a picture or video is taken.

User device 110 can also include an LED 840 and LED controller 844. LED controller 844 can be configured to control when LED 840 emits light. The light emission may be indicative of an event, such as whether a message has been received, a request has been processed, an initial access time has passed, etc.

Flash controller 846 can control whether flash 846 emits light via controlling a circuit so as to complete a circuit between a power source and flash 846 when flash 842 is to emit light. In some instances, flash controller 846 is wired to a shutter mechanism so as to synchronize light emission and collection of image or video data.

User device 110 can be configured to transmit and/or receive signals from other devices or systems (e.g., over one or more networks, such as network(s) 170). These signals can include wireless signals, and accordingly user device 110 can include one or more wireless modules 850 configured to appropriately facilitate transmission or receipt of wireless signals of a particular type. Wireless modules 850 can include a Wi-Fi module 852, Bluetooth module 854, near-field communication (NFC) module 856 and/or cellular module 856. Each module can, for example, generate a signal (e.g., which may include transforming a signal generated by another component of user device 110 to conform to a particular protocol and/or to process a signal (e.g., which may include transforming a signal received from another device to conform with a protocol used by another component of user device 110).

Wi-Fi module 854 can be configured to generate and/or process radio signals with a frequency between 2.4 gigahertz and 5 gigahertz. Wi-Fi module 854 can include a wireless network interface card that includes circuitry to facilitate communicating using a particular standard (e.g., physical and/or link layer standard).

Bluetooth module 854 can be configured to generate and/or process radio signals with a frequency between 2.4 gigahertz and 2.485 gigahertz. In some instances, bluetooth module 854 can be configured to generate and/or process Bluetooth low-energy (BLE or BTLE) signals with a frequency between 2.4 gigahertz and 2.485 gigahertz.

NFC module 856 can be configured to generate and/or process radio signals with a frequency of 13.56 megahertz. NFC module 856 can include an inductor and/or can interact with one or more loop antenna.

Cellular module 858 can be configured to generate and/or process cellular signals at ultra-high frequencies (e.g., between 698 and 2690 megahertz). For example, cellular module 858 can be configured to generate uplink signals and/or to process received downlink signals.

The signals generated by wireless modules 850 can be transmitted to one or more other devices (or broadcast) by one or more antennas 859. The signals processed by wireless modules 850 can include those received by one or more antennas 859. One or more antennas 859 can include, for example, a monopole antenna, helical antenna, intenna, Planar Inverted-F Antenna (PIFA), modified PIFA, and/or one or more loop antennae.

User device 110 can include various input and output components. An output component can be configured to present output. For example, a speaker 862 can be configured to present an audio output by converting an electrical signal into an audio signal. An audio engine 864 can effect particular audio characteristics, such as a volume, event-to-audio-signal mapping and/or whether an audio signal is to be avoided due to a silencing mode (e.g., a vibrate or do-not-disturb mode set at the device).

Further, a display 866 can be configured to present a visual output by converting an electrical signal into a light signal. Display 866 may include multiple pixels, each of which may be individually controllable, such that an intensity and/or color of each pixel can be independently controlled. Display 866 can include, for example, an LED- or LCD-based display.

A graphics engine 868 can determine a mapping of electronic image data to pixel variables on a screen of user device 110. It can further adjust lighting, texture and color characteristics in accordance with, for example, user settings.

In some instances, display 866 is a touchscreen display (e.g., a resistive or capacitive touchscreen) and is thus both an input and an output component. A screen controller 870 can be configured to detect whether, where and/or how (e.g., a force of) a user touched display 866. The determination may be made based on an analysis of capacitive or resistive data.

An input component can be configured to receive input from a user that can be translated into data. For example, as illustrated in FIG. 8, user device 110 can include a microphone 872 that can capture audio data and transform the audio signals into electrical signals. An audio capture module 874 can determine, for example, when an audio signal is to be collected and/or any filter, equalization, noise gate, compression and/or clipper that is to be applied to the signal.

User device 110 can further include one or more cameras 876, 880, each of which can be configured to capture visual data (e.g., at a given time or across an extended time period) and convert the visual data into electrical data (e.g., electronic image or video data). In some instances, user device 110 includes multiple cameras, at least two of which are directed in different and/or substantially opposite directions. For example, user device 110 can include a rear-facing camera 876 and a front-facing camera 880.

A camera capture module 878 can control, for example, when a visual stimulus is to be collected (e.g., by controlling a shutter), a duration for which a visual stimulus is to be collected (e.g., a time that a shutter is to remain open for a picture taking, which may depend on a setting or ambient light levels; and/or a time that a shutter is to remain open for a video taking, which may depend on inputs), a zoom, a focus setting, and so on. When user device 110 includes multiple cameras, camera capture module 878 may further determine which camera(s) is to collect image data (e.g., based on a setting).

Figure 9:
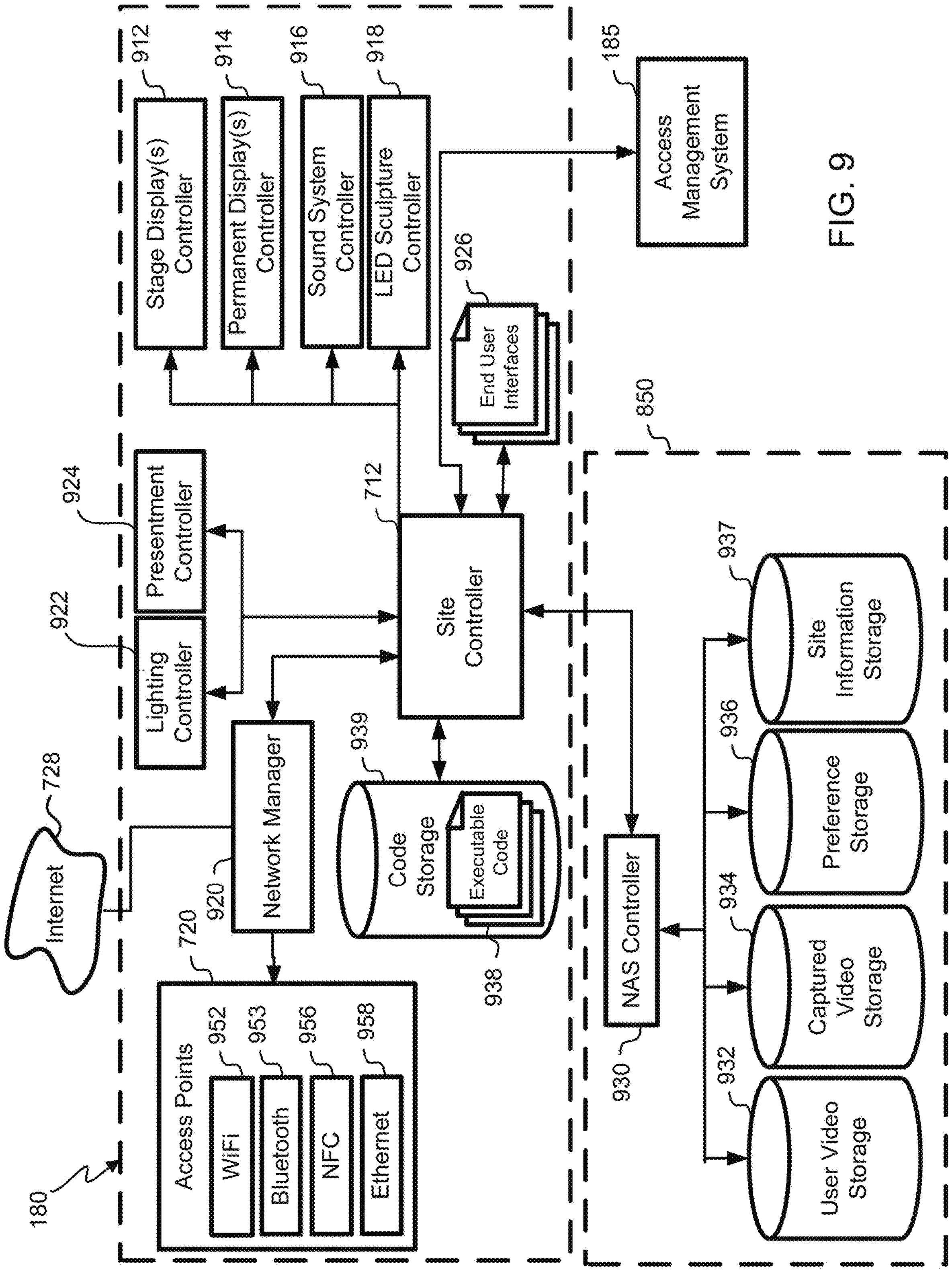
FIG. 9 illustrates sample components of an embodiment of site system 180, including connections to a NAS and access management system.

FIG. 9 illustrates sample components of an embodiment of site system 180, including connections to NAS 750 and access management system 185. Embodiments of site controller 712 use network manager 920 to connect via access points 720 (using e.g., WiFi 952, Bluetooth 953, NFC 956, Ethernet 958, and/or other network connections) to other network components, such as site network 716 and mobile devices 724. In some embodiments, site system 280 uses site controller 712 to control aspects of a spatial region associated with a resource. An access right grants access to the spatial region during a defined time period. A broad variety of features can be controlled by different embodiments, including: permanent lights (e.g., with lighting controller 922), lights (e.g., with presentment controller 924), display screens (e.g., with stage display(s) controller 912), permanent display screens (e.g., with permanent display(s) controller 914), and the sound system (e.g., with the sound system controller 916).

A more detailed view of NAS 750 is shown, including NAS controller 930 coupled to user video storage 932, captured video storage 934, preference storage 936, and 3D model 938. Captured video storage 934 can receive, store and provide user videos received from mobile devices 724. In some embodiments, site controller 712 triggers the automatic capture of images, audio and video from mobile devices 724, such triggering being synchronized to activities in an event. Images captured by this and similar embodiments can be stored on both the capturing mobile device 724 and user video storage 932. In an embodiment, site controller 712 can coordinate the transfer of information from mobile devices to NAS 750 (e.g., captured media) with activities taking place during the event. When interacting with mobile devices 724, some embodiments of site controller 712 can provide end user interfaces 926 to enable different types of interaction. For example, as a part of engagement activities, site controller may offer quizzes and other content to the devices. Additionally, with respect to location determinations discussed herein, site controller can supplement determined estimates with voluntarily provided information using end user interfaces 926, stored in a storage that is not shown.

In some embodiments, to guide the performance of different activities, site controller 712 and/or other components may use executable code 938 tangibly stored in code storage 939. In some embodiments, site information storage 937 can provide information about the site, e.g., 3D models of site features and structure.

Figure 10A:
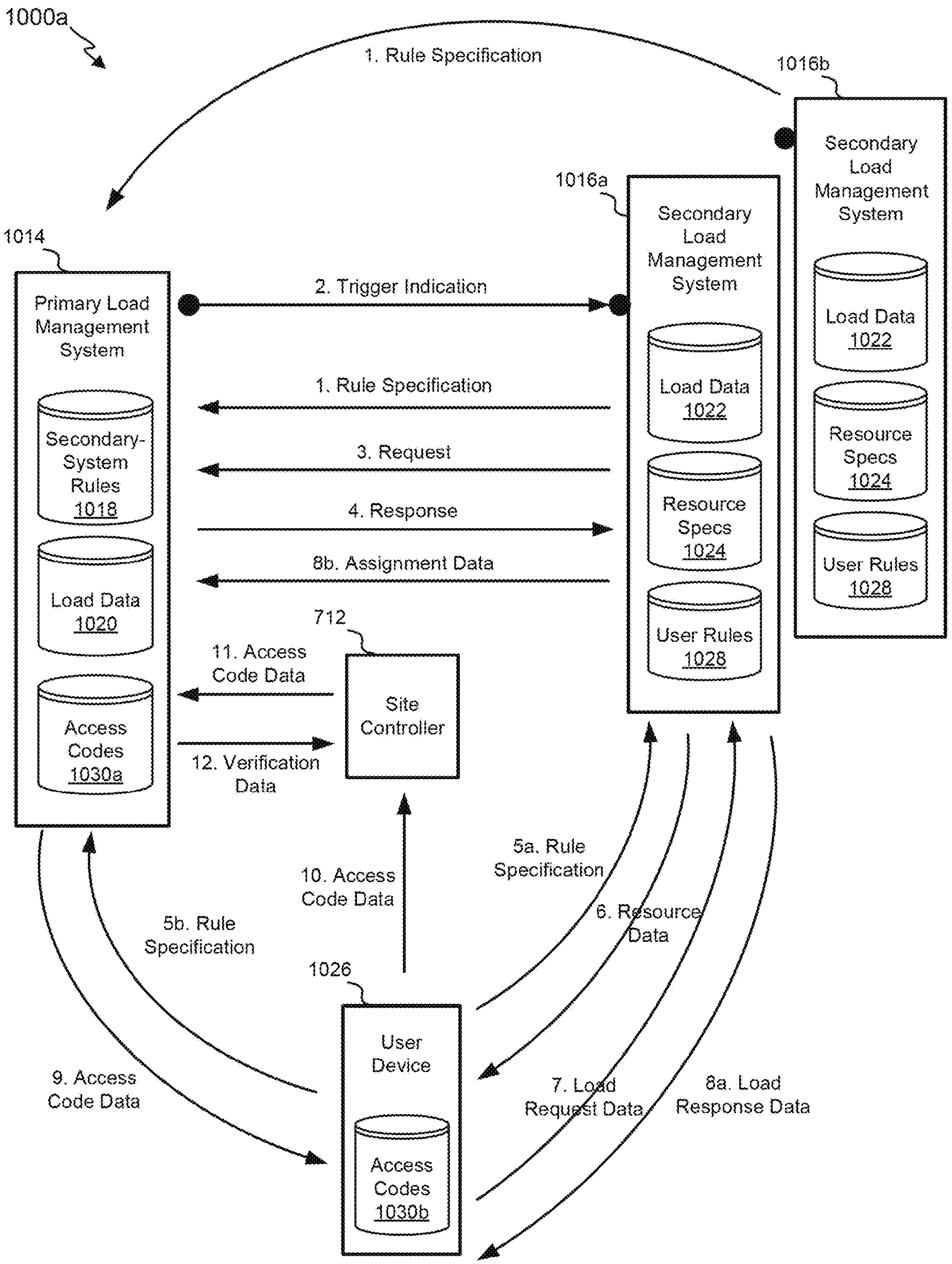
FIGS. 10A and 10B illustrate examples of communication exchanges involving primary and secondary load management systems.

Referring next to FIG. 10A, an example of a communication exchange 1000*a* involving primary load management system 1014 and each of a plurality of secondary load management systems 1016*a*, 1016*b* is shown. In some instances, secondary load management system 1016*a* is managed by an entity different than an entity that manages secondary load management system 1016*b*. Primary load management system 1014 may include and/or share properties with a primary assignment management system 214. Each of one or both of secondary load management system 1016*a* and 1016*b* may include or correspond to a secondary assignment system 216. Communications shown in FIG. 10 may be transmitted over one or more networks, such as network 270, the Internet and/or a short-range network.

In one instance, one of secondary load management system 1016*a* or 1016*b* is managed by a same entity as manages primary load management system 1014. In one instance, each of secondary load management system 1016 and 1016*b* is managed by an entity different than an entity managing primary load management system 1014. Primary load management system 1014 can include a system that, for example, manages a master access-right assignment data store, distributes access codes, performs verification data for access attempts, and so on. Secondary load management systems 1016*a*, 1016*b* can include systems that, for example, facilitate assignment of access codes to users. For example, secondary load management systems 1016*a*, 1016*b* can be configured to request allocation of access-right slots, which may result in a temporary or final allocation or assignment to the system, a hold on the access-right slots, and/or a distribution of data pertaining to the slot(s). Secondary load management systems 1016*a*, 1016*b* may then facilitate transmission of the access-right slots to one or more users and identify a user that has requested one or more particular access-right slots. The secondary load management system can then facilitate an assignment of the access-right slots by (for example) transmitting one or more access codes to the user device, identifying the user to primary load management system 1014 or updating assignment data.

Communication exchange 1000*a* begins with transmission of one or more rule specifications from each secondary load management system 1016*a*, 1016*b* to primary load management system 1014. The rule specification can include one or more request parameters identify parameters of a load requested for allocation. For example, a rule specification can include a specification pertaining to a size of a target load (e.g., corresponding to a number of access-right slots). The specification may include a particular number or a threshold. A rule specification can include a specification of a type of at least part of the load, such as one that identifies a resource or type of resource and/or one that identifies a characteristic of one or more access-right slots (e.g., a location). The specification may include a first allocation parameter that may identify a value for which access-right slots are being requested.

In some instances, a rule and/or request corresponds to a single resource, while in others, the rule and/or request corresponds to multiple resources. For example, a request may be for access-right results pertaining to each of three resources or to each resource available at a location in a season. Thus, in some instances, a rule specification identifies or is indicative of a number of resources. Resources may, but need not, be specifically identified in a rule specification, rule and/or request. For example, a rule specification may indicate that a defined number or range (e.g., 100-200) of access-right slots is requested for any given resource within a defined time period (e.g., year).

A rule specification can include an allocation parameter that identifies a parameter for allocating a load should it be allocated to the secondary load management system. To illustrate, secondary load management system 1016*a*, 1016*b* may be configured to receive allocations of access-right slots but to attempt to facilitate assignment of the access-right slots to users. Communication exchange 1000*a* can be configured so as to promote facilitated distribution to users upon allocation of access-right slots to a secondary load management system. Early provision of allocation parameters by a secondary load management system can promote such quick facilitated distribution.

For example, an allocation parameter can identify one or more communication channels (e.g., webpages, portals, information-distribution protocols, email addresses, etc.) for transmitting information pertaining to at least part of the load to each of one or more devices and/or an a second allocation parameter. This information may enable primary load management system 1014 to (for example) automatically provide information pertaining to allocated access-right slots via the communication channel(s) and/or to verify that allocation parameters comply with one or more primary-system rules (e.g., that may include an upper and/or lower threshold for an allocation parameter and/or limits on which communication channels may be used).

Primary load management system 1014 can define a rule for each secondary load management system 1016*a*, 1016*b* based on the rule specifications. The rules can be stored in a secondary system rules data store 1018.

Primary load management system 1014 can further include a load data store 1020. Load data store 1020 can include, for example, information pertaining to which access-right slots for a given resource are available and information pertaining to each of those slots. Load data store 1020 can further identify information pertaining to one or more defined loads, such as which access-right slots are corresponding to the load, to which secondary load management system a load has been allocated, whether an allocation includes any restrictions (e.g., time limits).

Primary load management system 1014 can assess whether a set of available access-right slots corresponds to request parameters identified in any secondary-system rules. For example, it can be determined whether a resource type corresponds to that specified in a request parameter, whether a quantity (and/or contiguous quantity) corresponds to that specified in a request parameter, whether a type of the access-right slots corresponds to that specified in a request parameter, and/or whether the quantity of access-right slots can be allocated for a value that corresponds to a first allocation parameter specified in a request parameter (e.g., the determination being based on defined values or thresholds associated with the access-right slots and/or a primary-system rule).

In some instances, it may be determined that request parameters identified in rules for multiple secondary load management system correspond to a same load or to a same at least part of a load. Primary load management system 1014 may include a switch, such as a content switch, that may evaluate a load, rules and/or systems to determine to which secondary load management system 1016 a load is to be allocated or identified. In these instances, the rules and/or systems may be prioritized to determine to which entity the load is to be allocated. The prioritization may depend on, for example, defined prioritizations of the systems, a time at which rule specifications were submitted (e.g., prioritizing early submission), a size parameter (e.g., prioritizing either lower or larger size requests), and/or first allocation parameters (e.g., prioritizing larger first allocation parameters).

It will be appreciated that, in various instances, a load may be generated in response to evaluation of a load (e.g., in an attempt to define a load that accords with request parameters), or a load may be first defined (e.g., based on which access-right slots remain available and/or distribution priorities of the primary load management system) and it is then determined which rule to which the load corresponds. In some instances, a primary-system rule as to which access-right slots are to be included in a load and/or a secondary-system rule as to which access-right slots are requested may depend on information, such as an environmental characterization corresponding to a resource, a throughput monitor and/or a discrepancy associated with a resource (e.g., a spread or line associated with a resource). In some instances, a primary-system rule and/or secondary-system rule may include a function that relates an environmental characteristic, throughput characteristic and/or discrepancy with an allocation parameter (e.g., such that larger discrepancies, poorer environmental characteristics and/or lower throughput prospects result in lower allocation parameters).

When it is determined that a load corresponds to a secondary-system rule (and/or any prioritization is performed), primary load management system can transmit a trigger indication to the associated secondary load management system 1016*a*. The trigger indication may identify characteristics of the load (e.g., a size, type of one or more access-right slots, resource, and/or allocation value). In some instances, the trigger indication may identify a rule and/or what specifications were defined in the triggered rule.

In some instances, communication exchange 1000*a* is configured so as to provide a secondary load management system 1016*a* a defined time period for transmitting a request responsive to a trigger indication. Access-right slots may, but need not, be placed on hold for the time period. Should a request not be received within the time period, primary load management system 1014 may transmit a same or different trigger indication to another secondary load management system with a rule corresponding to the load or may redefine a load so as to correspond with a rule of another secondary load management system and transmit a trigger indication accordingly. In some instances, a trigger indication is simultaneously transmitted to multiple secondary load management systems 1016, and a load may be allocated to a system that thereafter requests the load (e.g., in accordance with a first-responder or other secondary-system selection technique).

Secondary load management system 1016*a* can then transmit a request communication back to primary load management system that requests the load. Primary load management system 1014 can then transmit a response communication that confirms that the load is being allocated. In some instances, the response communication is transmitted subsequent to or in temporal proximity of a time at which a charge is issued or collected for the load. In some instances, then response communication includes further information about the load. For example, location of access-right slots in the load may be more precisely identified.

Secondary load management system 1016*a* can store data pertaining to the load in a load data store 1022. Load data store 1022 may further track statuses of access-right slots so as to be able to identify which access-right slots have been assigned to users. Secondary load management system 1016*a* can further manage and/or have access to a resource specification data store 1024 that can associate identifiers of various resources with corresponding information. The resource specifications may be, for example, included in a trigger-information or response communication from primary load management system 1014; identified via an external search (e.g., web crawl), and so on. Resource specifications may include, for example, a location and/or a date and time.

A user device 1026 can also transmit rule specifications to one or more of primary load management system 1014 and 1016*a*. The rule specifications may include request parameters, such as a size specification, type specification and/or assignment value (e.g., that may be precisely identified or a threshold). When rule specifications are transmitted and/or availed to secondary load management system 1016*a*, a corresponding user rule can be defined for the user device and/or user.

Secondary load management system 1016*a* can distribute data of a resource (or multiple resources) corresponding to the load allocated to the system. The resource data can include one or more resource specifications stored at resource specification data store 1024. The resource data may further include data associated with one or more access-right slots included in the load. For example, the resource data may identify a time and location of a resource and a location of each of one or more access-right slots. In some instances, the resource data further includes an allocation parameter, such as the second allocation parameter and/or one defined based thereupon included in a secondary-system rule specification or included in a rule associated with secondary load management system 1016*a*.

In some instances, secondary load management system 1016*a* controls the transmission of the resource data to one or more user devices 1026. In some instances, primary load management system 1014 facilitates the transmission. For example, the data may be identified in an interface provided, controlled and/or managed by secondary load management system 1016*a*, but primary load management system 1016 may have authorization to update the webpage, and thus primary load management system can update the secondary-system to include the resource data.

In some instances, resource data is selectively transmitted to user devices. For example, resource data may be transmitted only to the user devices associated with user rules corresponding with at least part of the load.

User device 1026 can request assignment of at least part of the load. The user request can identify, for example, one or more access-right slots (e.g., and/or one or more resources). Secondary load management system 1016*a* can evaluate the request and respond with load response data. Such a response may be conditioned (for example) on confirming completion of the assignment process. The load response data may (for example) indicate that the assignment has been accepted and/or include confirmation data. Upon such acceptance, secondary load management system 1016*a* can also transmit assignment data to primary load management system. The load data can include an identification of the user device (or corresponding information, such as a name, email, profile, device identifier or phone number of a corresponding user) and/or one or more access-right slots being assigned. Primary assignment management system can update an assignment data store and/or load data store 1020 to reflect the assignment.

Primary load management system 1014 can then retrieve access code data from an access code data store 1030 and transmit the access code data to user device 1026. The access code data can correspond to the one or more access rights being assigned to the user. The access code data can be transmitted (for example) immediately, at a defined time (e.g., relative to a time of a resource), or upon receiving a request (e.g., triggered by a user input or detecting that a user device has crossed a geofence corresponding to a resource).

User device 1026 can store the access code(s) in an access-code data store 1030*b*. Subsequently, user device 1026 can retrieve the access-code data and transmitting it to a site controller 712 (e.g., upon detecting the site controller, upon receiving a request from the site controller or in response to detecting a corresponding user input). Site controller 712 can include one located at a resource location. Site controller 712 can transmit the access-code data to primary load management system 1014, which can then determine whether the code is a valid code, has not been previously redeemed and/or corresponds to one or more characteristics (e.g., a resource associated with or identified by the site controller, a time, a device characteristic, etc.). A result of such determination(s) can be transmitted back to site controller 712 such that a user can then be granted or denied requested access to a resource.

It will be appreciated that one, more or all communications represented in communication exchange 1000*a* can be transmitted via (for example) a web site, a web portal, another portal, an email exchange, a message (e.g., SMS message) exchange, and/or an API.

It will be appreciated that part or all of a communication exchange can be performed in an automated or semi-automated manner. For example, one or more rules (e.g., secondary-system rules or user rules) can be defined so as to trigger automatic allocation or assignment upon detecting data that corresponds to request parameters in the rules. As another example, the one or more rules can be defined so as to trigger a notification communication to the user device or secondary load management system that includes an alert that the request parameters are satisfied and enable to user device or secondary load management system to transmit a request for allocation or assignment.

It will also be appreciated that various modifications to communication exchange 1000*a* are contemplated. For example, in one instance, secondary load management system 1016*a* may at least partly manage access codes. For example, one or more access codes corresponding to a load may be transmitted from primary load management system 1014 to secondary load management system 1016*a* as part of a response. Secondary load management system 1016*a* may then transmit select access codes to a user device 1026, and (in various instances) either primary load management system 1014 or secondary load management system 1016*a* may provide verification of the code to site controller 712.

Figure 10B:
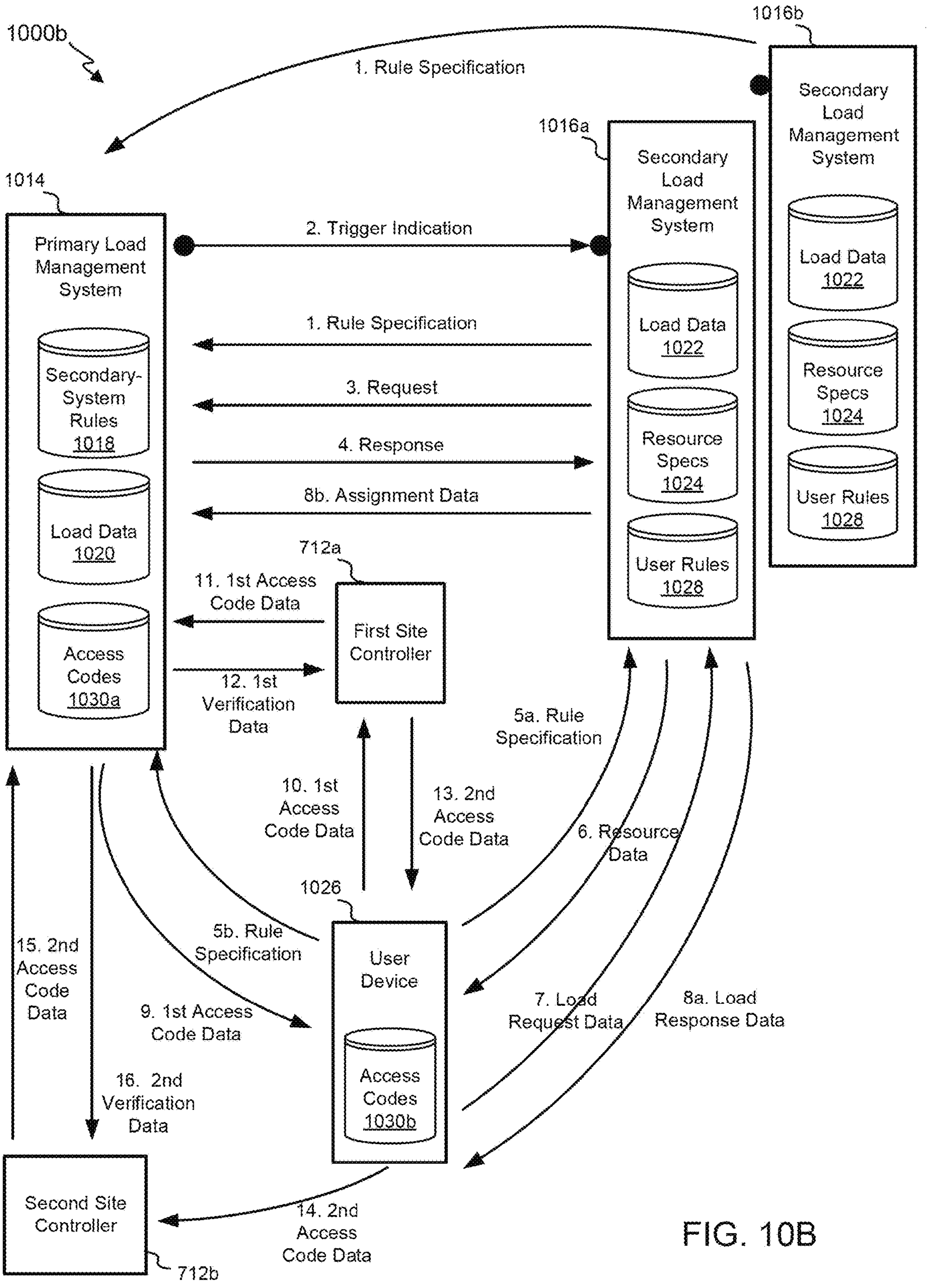

Referring next to FIG. 10B, another example of a communication exchange 1000*b* involving primary load management system 1014 and each of a plurality of secondary load management systems 1016*a*, 1016*b* is shown. In this instance, two different types of access code data are associated with an assignment.

As shown, in response to an initial assignment of an access-right slot, primary load management system 1014 transmits first access code data to user device 1026. The first access code data may include data representing that access to a resource has been authorized. However, in this instance, the first access code data may lack a precision of association that would associate the first access code data with one or more particular access characteristics. For example, the data may lack information that would identify a particular location within a resource area for which access is to be granted.

Subsequently (e.g., after a predefined time period, such as within a defined period from a resource time; and/or when a user device 1026 crosses a geofence corresponding to a resource, and/or when a user device 1026 receives input or a site-controller request indicating that access data is to be transmitted to a nearby site controller), user device 1026 may retrieve the first access code data and transmit it (e.g., via a short-range communication) to a first site controller 712*a*.

First site controller 712*a* may communicate with primary load management system 1014 to verify the data, in a manner similar to that described herein. Upon detecting that the first access code data has been verified, first site controller 712*a* can transmit second access code data to user device 1026. The second access code data have a precision of association that associates the data with one or more particular access characteristics. The second access code data may be, for example, generated at first site controller 712*a* or received from primary load management system (e.g., as part of the verification communication or as part of another communication). The particular access characteristics may be identified based on, for example, a technique described in U.S. application Ser. No. 14/063,929, filed on Oct. 25, 2013, which is hereby incorporated by reference in its entirety for all purposes. The particular access characteristics may be identified based on, for example, for which and/or how many access-right results first access code data had been previously verified and/or which and/or how many second access codes had been generated and/or transmitted.

The second access code data may indicate where access to a resource is authorized, and user device 1026 may thus move to a corresponding location. In some instance, a second site controller 712*b* is associated with the corresponding location. User device 1026 may then transmit the second access code data (e.g., when user device 1026 detects that it has crossed a geofence corresponding to the location and/or when user device 1026 receives input or a site-controller request indicating that access data is to be transmitted to a nearby site controller) to second site controller 712*b*. Second site controller 712*b* can determine whether the code is verified (e.g., valid, has not been previously used, and/or corresponds to the user device 1026 and/or location). The determination can include (for example) transmitting the second access code data to another device (e.g., primary load management system 1014, a local server, or another site controller, such as first site controller 712*a*) and receiving second verification data that indicates whether the second access code data is verified. The determination can, alternatively or additionally, include a local determination, which may be based (for example) on comparing the second access code data to data in a local access-code data store to determine whether there is a match and/or whether the second access code data (or corresponding access code data that is associated with same one or more particular characteristics) has been previously verified. The local access-code data store may be populated by second site controller 712*b*, for example, in response to communications from one or more other site controllers and/or primary load management system 1014 that identify second access code data that have been issued.

Figure 11:
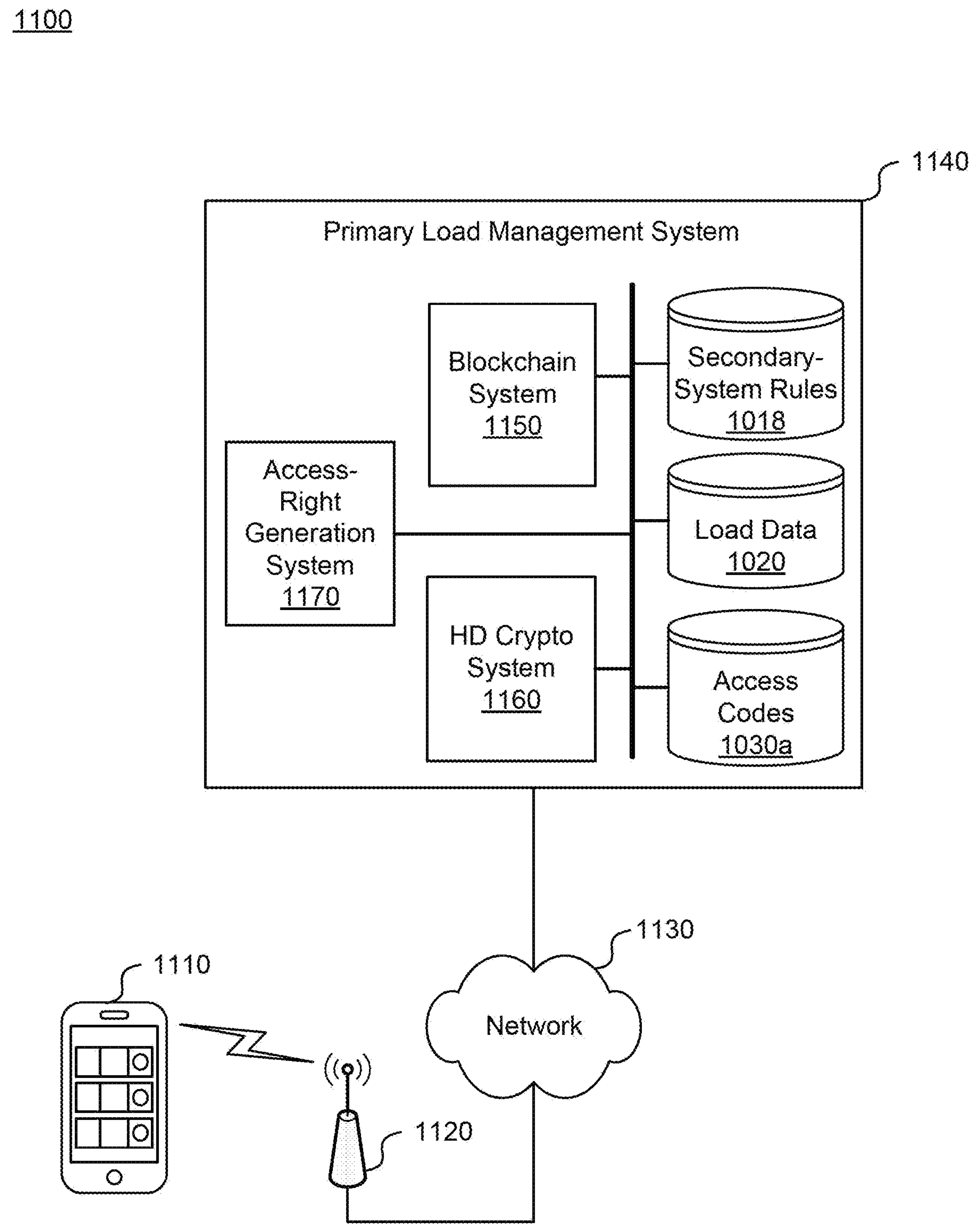
FIG. 11 is a block diagram illustrating an example network environment that can be used to enhance access control to resources using hierarchical deterministic cryptography and the blockchain.

FIG. 11 is a block diagram illustrating an example network environment that can be used to enhance access control to resources using hierarchical deterministic cryptography and the blockchain. In some implementations, network environment 1100 may include user device 1110, gateway 1120, network 1130, and primary load management system 1140. User device 1110 may exchange digital signals or digital communications with primary load management system 1140 by way of gateway 1120 and network 1130. Network 1130 may be any public, private or cloud-based network that facilitates communications to the Internet. While user device 1110 is shown as a mobile phone in FIG. 11, it will be appreciated that user device 1110 can be any portable (e.g., laptop, tablet computer, smart watch, or otherwise portable Internet-connected computing device) or non-portable (e.g., desktop computer, electronic kiosk, Internet-connected turnstile, etc.) computing device.

Primary load management system 1140 may include a network of servers and databases. Primary load management system 1140 may include secondary-system rules 1018, load data 1020, and access codes 1030*a*, as described above. In some implementations, however, primary load management system 1140 may also include blockchain system 1150, access-right generation system 1170, and hierarchical deterministic cryptography ("HD Crypto") system 1160. Primary load management system 1140 may be a blockchain-based access-right system that uses a distributed ledger represented across a public or private blockchain (i.e., blockchain system 1150) to manage the generation, ownership, transfer, and validation of access rights to resources (e.g., events), and/or the authentication that an access-right holder is in possession of a known cryptographic account. As a non-limiting example, primary load management system 1140 may be a networked system operated by a primary access-right issuer. Primary load management system 1140 can generate or issue an access right to a resource using access-right generation system 1170. For example, access-right generation system 1170 may be a server configured to generate and manage unique access codes for each access right to the resource. The unique access codes may be generated using one or more complex algorithms and stored at a secure, central server (e.g., at access codes database 1030*a*).

Primary load management system 1140 may operate an online platform (application servers, web servers, and/or database servers not shown) that enables access-right holders to purchase access rights online. User device 1110 may access the online platform to request an access right to a resource. In some implementations, the access-right request from user device 1110 can be processed by primary load management system 1140. For each electronic access right that is successfully assigned to an access-right holder, HD crypto system 1160 can input the private or sensitive information associated with the access-right holder (e.g., access-right holder's email address or member identifier) into one or more HD cryptography algorithms (e.g., a key derivation function) to derive a key pair that is specific to the access-right holder (e.g., a first private key and a first public key). The first public key may identify the access-right holder much like a user ID would, and thus, the first public key may not be sufficiently anonymous to be posted to the distributed ledger on the blockchain. In some implementations, the first private key can be used to derive another key pair using a resource-specific identifier as an input. The result may be a child key pair including a second private key and a second public key. The second public key can be transformed or truncated to form the anonymous address that uniquely represents the access-right holder, and that can be posted to the distributed ledger. For example, the anonymous address may be a 160-bit hash of the second public key.

In some implementations, HD crypto system 1160 can also derive a resource-specific key pair by inputting a unique resource identifier into the one or more HD cryptography algorithms. The access code of the access right that the access-right holder purchased can be encrypted using the resource-specific public key. Once HD cryptography system 1160 has derived the unique anonymous address to represent the access-right holder and encrypted the access code of the access right purchased by the access-right holder (e.g., using the public key derived as part of the resource-specific key pair), HD cryptography system 1160 can publish the unique anonymous address, along with the corresponding encrypted access code of the purchased access right, to blockchain system 1150 as an anonymous resource manifest. For example, the unique anonymous address representing the access-right holder and the encrypted access code data can be published to a distributed ledger that is represented across a public blockchain. Advantageously, while the unique anonymous address represents the access-right holder, the unique anonymous address cannot be traced back to the access-right holder. Additionally, because the unique anonymous address is derived using the access-right holder's private information (e.g., the access-right holder's email address) and the unique resource identifier, the unique anonymous address cannot be used for a different resource. Thus, the same access-right holder will be associated with two different anonymous addresses for two different resources.

In some implementations, the anonymous addresses for all of the access-right holders attending the resource can be posted to the distributed ledger. Further, in some implementations, each anonymous address can be posted along with the encrypted access code that corresponds with the anonymous address. Thus, the distributed ledger can serve as the manifest for the resource. That is, the only information needed to manage access control into the resource is contained in the distributed ledger, and as a result, the ACL devices do not need to communicate with the centralized servers to validate an access-right holder each time an access-right holder attempts to enter the venue. Instead, the ACL device stores the distributed ledger and can reference the distributed ledger to determine whether or not an access-right holder should be granted access to the resource. However, while the published anonymous addresses for access-right holders does not expose the identity of the access-right holders, publishing the anonymous addresses to the distributed ledger can expose certain business intelligence relating to the resource, such as the number of access-right holders attending the resource. In some implementations, to address this issue, HD cryptography system 1160 can generate a plurality of artificial anonymous addresses to pad the real resource manifest stored as the distributed ledger. HD cryptography system 1160 stores a reference for each artificial anonymous address that is created, and thus, HD cryptography 1160 can identify which anonymous addresses are real and which are artificially created to pad the resource manifest. Padding the resource manifest with artificial anonymous addresses can obscure the business intelligence that can be gleaned from the distributed ledger.

Figure 12:
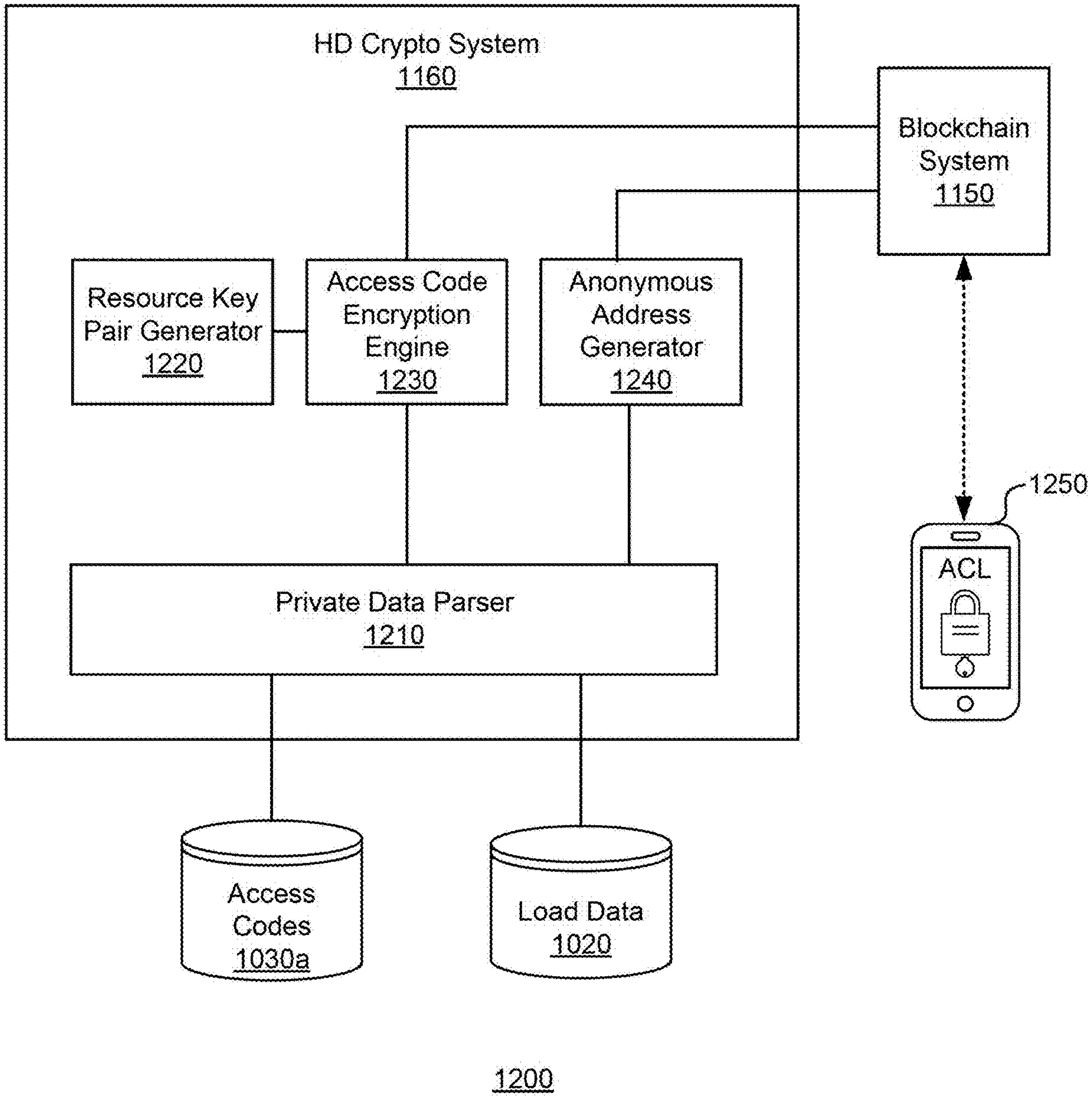
FIG. 12 is a block diagram illustrating an example network environment for enhancing access control.

FIG. 12 is a block diagram illustrating network environment 1200 for controlling access to a resource using HD cryptography and a blockchain-based access-right system. In some implementations, network environment 1200 includes HD cryptography system 1160, blockchain system 1150, and ACL device 1250. Network environment 1200 may be configured to enable ACL device 1250 to control which users or access-right holders enter a resource.

In some implementations, ACL device 1250 may be located at or near an entry gate of a venue. For venues that have multiple entry gates, an ACL device may be located at or near each ACL device 1250. Further, ACL device 1250 may be configured to connect to the Internet and/or other ACL devices located within or near the spatial area. While FIG. 12 shows ACL device 1250 as being a smartphone, it will be appreciated that ACL device 1250 may be any portable (scanning device, laptop, tablet computer, etc.) or non-portable (e.g., desktop computer, electronic kiosk, networked turnstile, etc.) computing device. In some implementations, ACL device 1250 may be configured to store code that, when executed, causes ACL device 1250 to establish a short-range communicate channel with a user's smartphone to retrieve a string of information. A native application or SDK running on the user's smartphone may be configured to communicate with ACL device 1250 in order to provide ACL device 1250 with the requested information, which will enable ACL device 1250 to determine whether or not to grant the access-right holder entry to the spatial area.

In some implementations, access codes **1030*a* and load data 1020 may each be secure databases within a network of computing devices operated by the primary load management system. Access codes 1030*a* and load data 1020 may store private or sensitive information relating to access-right holders or resources, and thus, access codes 1030*a* and load data 1020 may not be accessible to the public. Access codes 1030*a* may be a database that stores the access codes for access rights to a resource. Access codes 1030*a* may store access codes and, for each access code, access codes 1030*a* may also store a flag indicating whether or not the access code is assigned to an access-right holder. If the access code is assigned to an access-right holder, then the access right corresponding to that access code has been purchased by the access-right holder. The access-right holder's unique identifier may or may not be stored together with the access code. Load data 1020 may be a database that stores the unique identifiers of access-right holders for the resource. As a non-limiting example, load data 1020** may store the unique member identifier of each access-right holder, the email address or phone number of each access-right holder, and other information that is suitable to be stored in a user profile of an access-right holder.

In some implementations, HD cryptography system 1160 may include private data parser 1210, resource key pair generator 1220, access code encryption engine 1230, and anonymous address generator 1240. Private data parser 1210 may be a processor storing or having access to code that, when executed, causes HD cryptography system 1160 to securely communicate with access codes **1030*a* and load data 1020 to retrieve the private or sensitive information relating to access-right holders. Private data parser 1210 may communicate with access codes 1030*a* and 1020 to retrieve, parse, and/or format the private data stored therein. The private data may then be processed by anonymous address generator 1240, and/or access code encryption engine 1230 to facilitate the derivation of key pairs that can be used to create anonymous addresses and encrypt access codes, respectively. The anonymous addresses and encrypted access codes will be published publicly on a distributed ledger represented across the blockchain (e.g., blockchain system 1150**).

In some implementations, resource key pair generator 1220 may be a secure database for persisting root-level seed passwords. Root-level seed passwords may be used to set up subsequent derivation functionality. In some examples, the root-level seed passwords may be persisted in a database entry, configuration file on a disk, or any other suitable data storage location. In some examples, the root-level seed passwords may be stored in-memory in one or more systems or any secured secret store. Regardless of the mechanism for persisting the root-level seed passwords, the passwords may be sufficiently hardened so as to prevent a leak. If a root-level seed password is leaked, then all subsequent derivations can be known. In some examples, additional techniques can be used to split the root-level seed passwords into various shards known to separate systems or separate users. As only a non-limiting example, a password may be split using "Shamir's Secret Sharing" algorithm. In some implementations, resource key pair generator 1220 may securely store the seed words for the user identity-level derivation tree (for the derivation of the user's anonymous address), the resource-level derivation tree (for the derivation of the resource-specific key pairs), and any other seeds.

To illustrate and only as a non-limiting example, private data parser 1210 may communicate with access codes **1030*a* and load data 1020 to securely retrieve the email address and access code (e.g., the private data) associated with each access-right holder for a specific resource. Private data parser 1210 may format the private data, as needed, and input the email address for each access-right holder into anonymous address generator 1240. Anonymous address generator 1240 may be configured to run a key derivation function using the access-right holder's email address as an input. The key derivation function may output a key pair (e.g., a private key and a public key) for each access-right holder. The root-level seed password, which is used to generate the subsequent key pair derivations, may be securely stored at the resource key pair generator 1220. However, the public key that is derived for an access-right holder is similar to a user identifier because the same public key would represent the access-right holder for other resources, which is not secure or entirely anonymous. According to certain embodiments of the present disclosure, anonymous address generator 1240 may derive a child key pair using the initial private key that was derived based on the access-right holder's email address. Deriving the child key pair from the initial private key can use a resource-specific identifier as an input. The resource-specific identifier may be a code or string of alphanumeric information that uniquely represents the resource (e.g., and can be used to distinguish the resource from all other resources). For example, the child key pair can be derived using the key derivation function, and then stored as an HD wallet at a data store (not shown) of HD cryptography system 1160. The derived child key pair may include a child public key and a child private key. At this stage, anonymous address generator 1240 may compute a 160-bit hash of the child public key to generate the anonymous address for the access-right holder. It will be appreciated that anonymous address generator 1240** may use any technique to truncate the child public key so as to generate the anonymous address, and thus, the present disclosure is not limited to computing a 160-bit hash of the child public key to generate the anonymous address. Advantageously, the anonymous address represents a specific access-right holder attending a specific resource. As such, if the anonymous address is hacked or decrypted (e.g., if the child private key is misappropriated by a hacker), then any damage that can ensue is limited to the specific resource. The same access-right holder will have a different anonymous address if that same access-right holder attends a different resource (e.g., even a different show of the same performer).

In some implementations, access code encryption engine 1230 can include a processor storing code that, when executed, encrypts the access code of an access right purchased by an access-right holder. For example, HD cryptography system 1160 (or any other computing entity) may store a resource-specific identifier that uniquely represents the resource. It will be appreciated that the resource-specific identifier can be any alphanumeric string of information. Notably, the resource-specific identifier used by access code encryption engine 1230 may or may not be the same as the one used by anonymous address generator 1240 to derive the anonymous address. Access code encryption engine 1230 may use the access code as input into a key derivation function to generate a resource-specific key pair, which includes a resource-specific private key, from which a resource-specific public key is derived. The resource-specific public key can be used to encrypt the access code, and the resulting encryption may be stored at access code encryption engine 1230 or at a data store within the primary load management system, such as at HD cryptography system 1160. The resource-specific private key may also be securely stored within primary load management system, such as at HD cryptography system 1160.

In some implementations, for a specific access-right holder, the user's anonymous address (derived by anonymous address generator 1240) and the encrypted access code (encrypted by access code encryption engine 1230) representing the user's access right may be stored in a distributed ledger represented across blockchain system 1150. In some implementations, on the day of the resource, as entry to the venue begins, ACL device 1250 can communicate with an access-right holder's smartphone to retrieve the user's anonymous address. For example, a native application or SDK running on the access-right holder's smartphone may be configured to communicate with ACL device 1250 using a short-range communicate channel to provide ACL device 1250 with the access-right holder's unique anonymous address. Once the ACL device 1250 has retrieved the user's anonymous address received from the access-right holder's smartphone, ACL device 1250 can reference the distributed ledger stored at blockchain system 1150 to determine whether the anonymous address matches any anonymous addresses (or encrypted access codes) listed on the distributed ledger. If the access-right holder's anonymous address from the access-right holder's phone matches an anonymous address listed in the distributed ledger (which would naturally be stored in the distributed ledger in association with an encrypted access code of a valid access right), then ACL device 1250 can grant entry to the access-right holder. If, however, the user's anonymous address does not match any values published on the distributed ledger, then the ACL device 1250 would deny entry to the resource.

In some implementations, ACL device 1250 may serve as a blockchain node that stores the distributed ledger. All other ACL devices 1250 at entry gates within the venue may also store a copy of the distributed ledger. All ACL devices within the venue may communicate with each other and serve as a blockchain. In this implementation, ACL device 1250 would not need to communicate with blockchain system 1150 because the ACL devices within the venue serve as blockchain nodes. Advantageously, in this implementation, there would be minimal or potentially no server calls made by the ACL devices once the ACL devices download the resource-specific private key. Thus, ACL devices could securely manage access control to the resource, even in unsecure networks, without needing to communicate with a central server or public blockchain.

In some implementations, instead of the access-right holder proving that he or she should be granted access to the spatial area by (1) presenting a access code to ACL device 1250 (as in the traditional manner of entry performed by scanning an access code), or by (2) presenting the access-right holder's anonymous address using a native application or SDK running on the access-right holder's smartphone (as described above), the access-right holder can be authenticated by providing proof of identity using a cryptographic account. For example, a known access-right holder can operate his or her smartphone to load a native application or SDK. The native application or SDK can be configured to sign a time-sensitive payload (automatically or upon receiving an instruction or input from the access-right holder) with the private key representing the access-right holder. When the access-right holder approaches the entry gate, ACL device 1250 can wirelessly communicate with the access-right holder's smartphone to retrieve the access-right holder's public key using the native application or SDK. ACL device 1250 can use the access-right holder's public key to verify that the payload is signed using the private key corresponding to the access-right holder. The verification performed by ACL device 1250 can represent a form of proof that the access-right holder is in possession of a cryptographic account. As only a non-limiting example, the access-right holder can digitally sign a time-sensitive block hash using the access-right holder's private key. The block hash is unpredictable and newly created every 10-15 seconds from a blockchain. In some implementations, any continuously and randomly generated data can be used to sign a payload instead of the block hash.

Figure 13:
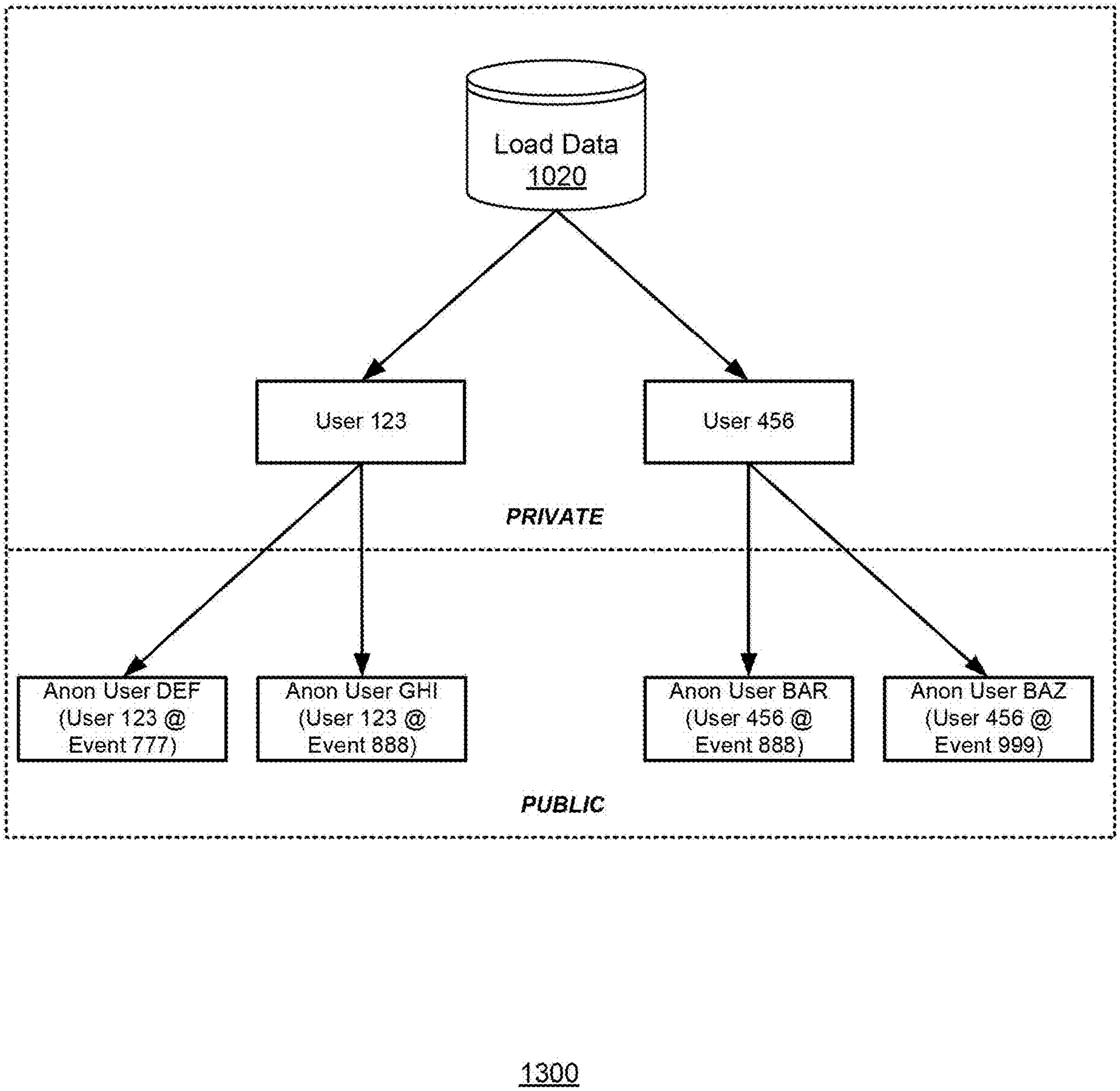
FIG. 13 is a block diagram illustrating an example process flow for using hierarchical deterministic cryptography to secure access-right holder identities.

FIG. 13 is a block diagram illustrating example process 1300 for deriving an anonymous address to represent an access-right holder attending a resource. Load data 1020 may store private data relating to access-right holders, as described above. For example, load data 1020 may be a database that stores unique member identifiers for all access-right holders with access rights to a resource. To illustrate and only as a non-limiting example, the HD cryptography system may access load data 1020 to retrieve the member identifier for a first access-right holder (i.e., User 123) and also a member identifier for a second access-right holder (i.e., User 456). The HD cryptography system can then use a single master seed and the member identifier User 123 to derive a key pair for the first access-right holder. However, that key pair (derived for the first access-right holder) should be further split into a child key pair because the key pair may not provide the access-right holder with sufficient anonymity. To address this issue and enhance anonymity, the HD cryptography system can derive a child key pair for the first access-right holder using the unique resource-specific identifier as an input. The resulting key pair may include a child public key and a child private key. The HD cryptography system can generate a 160-bit hash of the child public key to derive the user's anonymous address, which uniquely represents the first access-right holder's expected attendance to the resource. Advantageously, the anonymous address is resource specific, and thus, the same access-right holder attending different resources will be associated with two different anonymous addresses, and neither of the two anonymous addresses can be traced back so as to identify the first access-right holder. As illustrated in FIG. 13, Anon User DEF may represent the anonymous address representing the first access-right holder attending a resource with the resource-specific identifier of 777. Additionally, Anon User GHI may represent the anonymous address for that same access-right holder, but for the resource corresponding to resource-specific identifier 888. Using the same technique above, the HD cryptography system can derive the anonymous addresses for the second access-right holder with the member identifier of User 456.

It will be appreciated that, in some implementations, the HD cryptography system may add an additional layer of abstraction to further anonymize the data relating to access-right holders. For instance, the HD cryptography system may derive additional leaf nodes to "Anon User DEF (User 123 @ Event 777)" to represent multiple transactions. If, for example, a user purchases an access right (i.e., a first transaction), cancels that access right, and then repurchases that access right or any other access right to the same resource (i.e., a second transaction), then the HD cryptography system can provide different account identifiers for each of the first and second transactions. As a non-limiting example, the HD cryptography system may keep "Anon User DEF" in the private tier, but may publish to the public tier the anonymous addresses "Anon User DEF-1: User 123 @ Event 777 @ Nonce 1," which represents the first transaction, and "Anon User DEF-2: User 123 @ Event 777 @ Nonce 2," which represents the second transaction by the same user.

Figure 14:
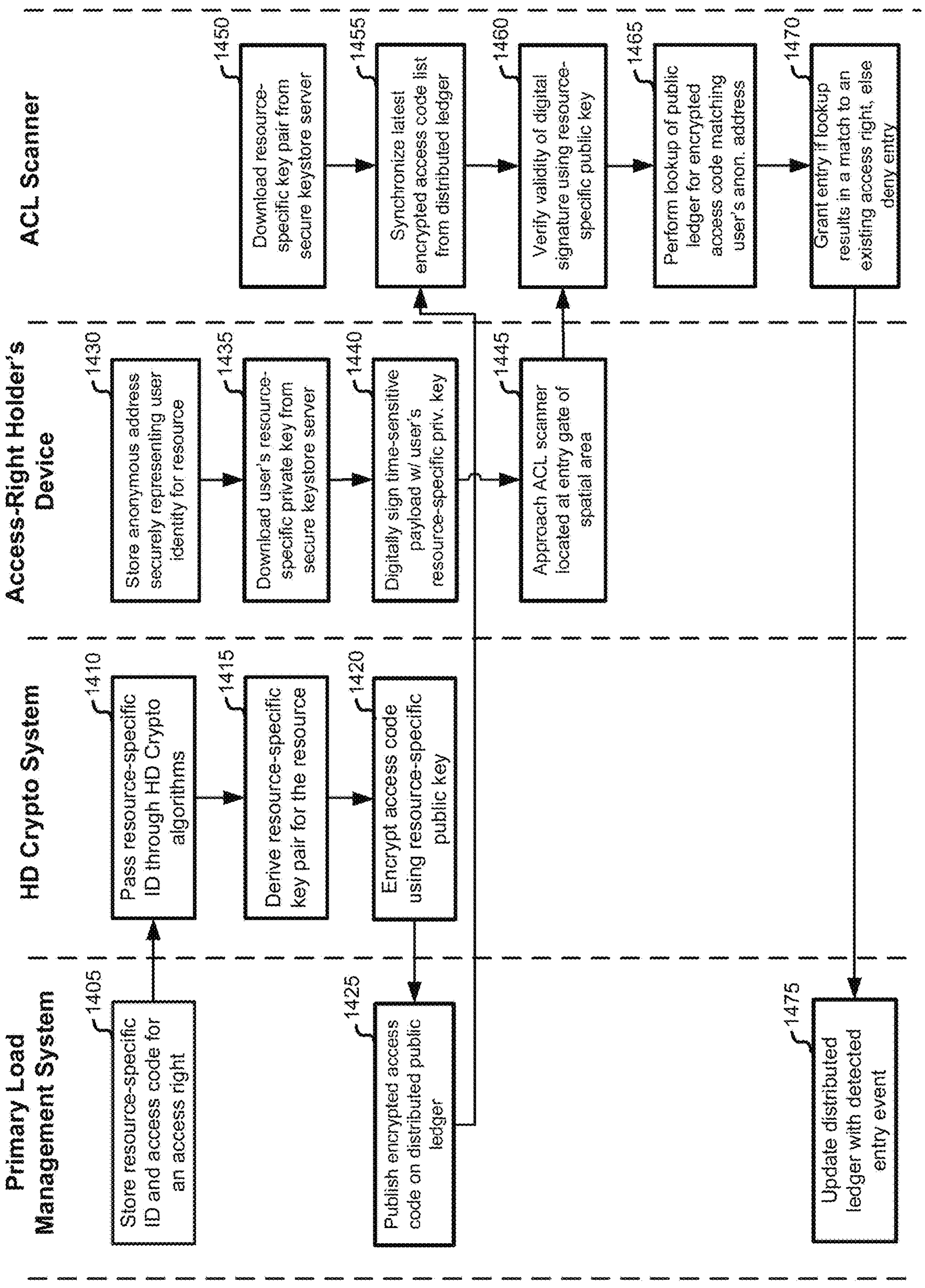
FIG. 14 is a swimlane diagram illustrating an example process flow for using hierarchical deterministic cryptography to secure user identities.

FIG. 14 is a swimlane diagram illustrating process flow 1400 for managing access control to resources using HD cryptography and the blockchain. Process 1400 may be performed to verify that an access-right holder is in possession of a valid access code or cryptographic account, so as to facilitate access control into a resource. Further, process 1400 may be performed, at least in part, by any of a primary load management system (including access codes 1030*a* or load data 1020), the HD cryptography system, the access-right holder's device (e.g., a smartphone running a native application or SDK that facilitates entry to the resource), or the ACL device, such as an ACL scanner.

Process 1400 begins at block 1405, where the primary load management system stores resource-specific identifiers and the access codes for all valid access rights to a resource. For example, a primary access-right issuer may issue access codes to resources and securely store the issued access codes at access codes 1030*a*. The primary load management system can also generate the unique identifier for each resource. At block 1410, the HD cryptography system can retrieve the resource-specific identifier for a given resource. Further, the HD cryptography system can pass the resource-specific identifier as an input into a key derivation function, and as a result, at block 1415, a key pair for the resource can be derived. The key pair may include a resource-specific private key and a resource-specific public key. For example, the resource-specific public key may be derived from the resource-specific private key. Further, the resource-specific private key may be securely stored at a keystore server, whereas, the resource-specific public key can be distributed. At block 1420, the HD cryptography system can encrypt the access code for each access right to the resource using the resource-specific public key. At block 1425, the encrypted access codes for all access rights to the resource can be published to a distributed ledger that is represented across a public or private ledger.

At block 1430, after an access-right holder purchases an access right to the resource, the native application or SDK running on the access-right holder's device (e.g., smartphone) may store the access-right holder's anonymous address within the native application. The access-right holder's anonymous address represents the access-right holder's expected attendance at the resource. At block 1435, the access-right holder's device may download the access-right holder's resource-specific private key from a secure keystore server. At block 1440, the access-right holder's device may digitally sign a time-sensitive payload with the access-right holder's resource-specific private key. As described above in the present disclosure, the time-sensitive payload may be a block hash that changes value every 10-15 seconds. Further, the access-right holder's private key may be the private key that is generated after inputting the access-right holder's member identifier (and subsequently the resource-specific identifier) into a key derivation function. Notably, the access-right holder's resource-specific private key is different from the resource-specific private key, which is used to decode the encrypted access codes. The access-right holder's resource-specific private key refers to the private key included in the key pair derived from the access-right holder's member identifier and the resource-specific identifier.

At block 1445, on the day of the resource, the access-right holder's device may approach an ACL scanner located at the entry gate of the venue. The access-right holder's device may transmit the access-right holder's anonymous address to the ACL scanner when the access-right holder's device is within a defined proximity (e.g., a few feet) of the ACL scanner. Before the access-right holder's device approaches the ACL scanner, at block 1450, the ACL scanner will have already downloaded the resource-specific key pair from a secure keystore server and synchronized the latest distributed ledger (which includes a list of encrypted access codes) at block 1455. At block 1460, the ACL scanner may verify the identity of the access-right holder by validating the digital signature (signed at block 1440 by the access-right holder's device) using the access-right holder's resource-specific public key. In some examples, the ACL scanner can retrieve the access-right holder's public key (either directly from the access-right holder's device or from a secure keystore server) to verify the signed payload (e.g., that the access-right holder's device is in possession of the access-right holder's private key), which proves the identity of the access-right holder. Additionally, at block 1465, the ACL scanner may use the access-right holder's anonymous address to resolve any available access codes for the access-right holder in the resource manifest stored on the distributed ledger. For example, the ACL scanner may perform a lookup of the distributed ledger to query for any encrypted access codes that match or correspond to the access-right holder's anonymous address. The distributed ledger may be a data structure that stores anonymous addresses in one column and, potentially, the encrypted access codes that correspond to the anonymous addresses in another column. Thus, performing a lookup of an access-right holder's anonymous addresses would identify any valid encrypted access codes if the lookup operation results in a match. At block 1470, if there is a match, then the ACL scanner can generate a signal that causes a networked turnstile to open or otherwise enable the access-right holder to enter the spatial area. If, however, there is no match, then the ACL scanner would not allow the individual (claiming to be an access-right holder) to enter the venue. At block 1475, the distributed ledger can be updated to reflect that an entry event has been detected with respect to the access-right holder.

Figure 15:
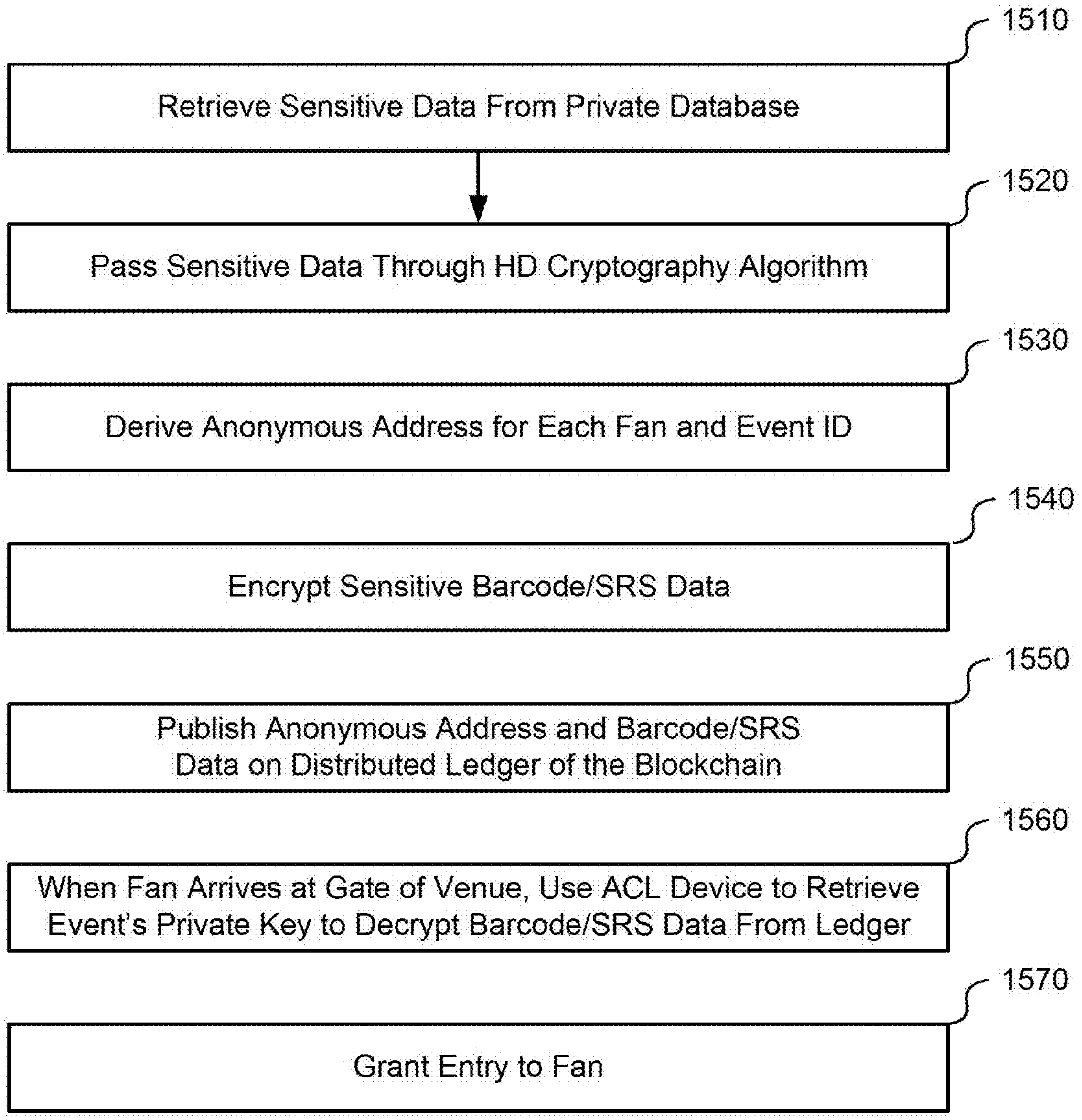
FIG. 15 is a flow diagram illustrating an example process flow for using hierarchical deterministic cryptography to secure user identities.

FIG. 15 is a flowchart illustrating example process 1500 for securely managing access control to resources using HD cryptography and the blockchain. Process 1500 may be performed at least in part by the primary load management system, the HD cryptography system, the blockchain system, the access-right holder's device, and the ACL device. Further, process 1500 is performed to enhance the security of access control to resources by deriving cryptographically strong anonymous addresses and encrypted access codes that are published on a distributed ledger of a public blockchain.

Process 1500 begins at block 1510, where sensitive or private information is retrieved from the primary load management system, which is a private network operated by the primary access-right issuer. For example, the sensitive or private information may include, but is not limited to, an access-right holder's member identifier, username, email address, or phone number, or the access code of the access right purchased by the access-right holder. At block 1520, the HD cryptography system can pass the retrieved information into one or more HD cryptographic algorithms, such as a key derivation function, to derive a key pair specific to the access-right holder. That is, the key pair may include a private key and a public key that is specific to the access-right holder. The public key can be used to represent the access-right holder much like a user identifier or username, and thus, the public key may not provide sufficient anonymity to the access-right holder. Thus, to further anonymize the access-right holder, the HD cryptography proceeds to derive a child key pair from the private key using a resource-specific identifier as the input. The resulting child key pair may include a child private key and a child public key. In some implementations, at block 1530, a 160-bit hash can be computed using the child public key to generate the anonymous address for the access-right holder. Advantageously, the anonymous address is resource specific, and thus, if the child private key is hacked or misappropriated, the damage cannot be extended to other resources.

At block 1540, the access code of the access right purchased by the access-right holder can be securely encrypted using the resource-specific public key. For example, the HD cryptography system can retrieve the resource-specific identifier of the resource. The resource-specific identifier may be a unique identifier that distinguishes the resource from all other resources, even those by the same performer. Further, the HD cryptography system can pass the resource-specific identifier into a key derivation function to output a key pair that is specific to the resource. The resource-specific key pair may include a resource-specific private key (which is used to decrypt) and a resource-specific public key (which is used to encrypt). Thus, the HD cryptography system can encrypt the access codes using the resource-specific public key.

At block 1550, the anonymous address (representing the access-right holder) and the encrypted access code can be posted to the distributed ledger represented across the blockchain and may represent the resource manifest. In some implementations, the resource manifest may be padded with artificial anonymous address-encrypted access code combinations to obfuscate business statistics that could potentially be detected from the resource manifest. Advantageously, the anonymous address and the encrypted access code can be publicly available on the distributed ledger because these two values cannot be used to identify the access-right holder and cannot be used to decrypt the access code (unless the resource-specific private key is misappropriated).

At block 1560, the ACL devices located at the entry gates of the spatial area may store the resource-specific private key, which may be retrieved from the primary load management system. When the access-right holder approaches an ACL device, the ACL device may retrieve the anonymous address from the access-right holder's device. The ACL device can query the distributed ledger using the anonymous address retrieved from the access-right holder's device. In some implementations, the ACL device can perform a lookup operation of the distributed ledger using the access-right holder's anonymous address. At block 1570, the access-right holder may be granted entry to the resource if the access-right holder's anonymous address matches one or more associated decrypted access codes in the latest resource manifest. For example, if the lookup results in a match, then the ACL device can communicate with any other device, such as a networked turnstile, to grant the access-right holder access to the resource. Otherwise, the individual claiming to be an access-right holder is denied entry into the resource.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine-readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

I claim:

1. A computer-implemented method for controlling access to a resource, comprising:

retrieving, by a server, one or more sensitive data items from a private database, each of the one or more sensitive data items being capable of uniquely identifying a user device;

inputting the one or more sensitive data items into one or more cryptography algorithms by a hierarchical deterministic (HD) crypto system;

deriving a first private key and a first public key in response to inputting the one or more sensitive data items into the one or more cryptography algorithms;

inputting a resource-specific identifier into the one or more cryptography algorithms by the HD crypto system;

deriving a child public key and a child private key from the first private key in response to inputting the resource-specific identifier into the one or more cryptography algorithms, wherein the child private key is stored in an access control list (ACL) device;

generating an anonymous address from the child public key using a data-truncation technique;

retrieving an access code associated with the resource in response to deriving the child public;

encrypting the access code with the child public key;

publishing the anonymous address and the encrypted access code on a distributed ledger without exposing the one or more sensitive data items;

determining that the user device is within a defined proximity of the ACL device;

retrieving the child private key from the ACL device, wherein the ACL device is present at a spatial area associated with the resource;

decrypting the access code by the retrieved child private key;

retrieving the anonymous address from the user device entering the spatial area associated with the resource;

querying the distributed ledger using the retrieved anonymous address;

granting entry to the user device in the spatial area on determining the anonymous address of the user device is associated with the decrypted access code; and prohibiting the entry to the user device in the spatial area on determining the anonymous address of the user device is not associated with the decrypted access code.

2. The computer-implemented method of claim 1, further comprising:

storing a manifest on the distributed ledger represented across a public blockchain, the manifest including the anonymous address and the encrypted access code for each user accessing the resource.

3. The computer-implemented method of claim 2, wherein one or more artificial anonymous addresses are added to the manifest to obscure the manifest, and wherein the one or more artificial anonymous addresses are generated by the HD crypto system.

4. The computer-implemented method of claim 1, wherein the data-truncation technique includes computing 160-bit hash of the child public key to generate the anonymous address.

5. The computer-implemented method of claim 1, wherein the one or more sensitive data items include access-right holder's member identifier, username, email address, phone number, and the access code.

6. The computer-implemented method of claim 1, wherein the anonymous address and the encrypted access codes are published on the distributed ledger of a public block chain.

7. The computer-implemented method of claim 1, wherein the anonymous address represents the user device associated with the resource.

8. The computer-implemented method of claim 1, wherein the resource-specific identifier includes a code and a string of alphanumeric.

9. The computer-implemented method of claim 1, wherein the first private key and the second private key uniquely represent the user device.

10. The computer-implemented method of claim 1, wherein the child public key and the child private key uniquely represent the resource.

11. A system for controlling access to a resource, comprising:

one or more processors; and a non-transitory computer-readable storage medium containing instructions which, when executed on the one or more processors, cause the one or more processors to perform operations including:

retrieving, by a server, one or more sensitive data items from a private database, each of the one or more sensitive data items being capable of uniquely identifying a user device;

inputting, by a hierarchical deterministic (HD) crypto system, the one or more sensitive data items into one or more cryptography algorithms;

deriving a first private key and a first public key in response to inputting the one or more sensitive data items into the one or more cryptography algorithms;

inputting, by the hierarchical deterministic (HD) crypto system, a resource-specific identifier into the one or more cryptography algorithms;

deriving a child public key and a child private key from the first private key in response to inputting the resource-specific identifier into the one or more cryptography algorithms, wherein the child private key is stored in an access control list (ACL) device;

generating an anonymous address from the child public key using a data-truncation technique;

retrieving an access code associated with the resource in response to deriving the child public;

encrypting the access code with the child public key;

publishing the anonymous address and the encrypted access code on a distributed ledger without exposing the one or more sensitive data items;

determining that the user device is within a defined proximity of the ACL device;

retrieving the child private key from the ACL device, wherein the ACL device is present at a spatial area associated with the resource;

decrypting the access code by the retrieved child private key;

retrieving the anonymous address from the user device entering the spatial area associated with the resource;

querying the distributed ledger using the retrieved anonymous address;

granting entry to the user device in the spatial area on determining the anonymous address of the user device is associated with the decrypted access code; and prohibiting the entry to the user device in the spatial area on determining the anonymous address of the user device is not associated with the decrypted access code.

12. The system of claim 11, the one or more processors further perform operations including:

storing a manifest on the distributed ledger represented across a public blockchain, the manifest including the anonymous address and the encrypted access code for each user accessing the resource.

13. The system of claim 12, wherein one or more artificial anonymous addresses are added to the manifest to obscure the manifest, and wherein the one or more artificial anonymous addresses are generated by the HD crypto system.

14. The system of claim 11, wherein the data-truncation technique includes computing 160-bit hash of the child public key to generate the anonymous address.

15. The system of claim 11, wherein the one or more sensitive data items includes access-right holder's member identifier, username, email address, phone number, and the access code.

16. The system of claim 11, wherein the first private key and the second private key uniquely represent the user device.

17. The system of claim 11, wherein the resource-specific identifier includes a code and a string of alphanumeric.

18. The system of claim 11, wherein the child public key and the child private key uniquely represent the resource.

19. A computer-program product tangibly embodied in a non-transitory machine-readable storage medium, including instructions configured to cause a processing apparatus to perform operations including:

retrieving, by a server, one or more sensitive data items from a private database, each of the one or more sensitive data items being capable of uniquely identifying a user device;

inputting, by a hierarchical deterministic (HD) crypto system, the one or more sensitive data items into one or more cryptography algorithms;

deriving a first private key and a first public key in response to inputting the one or more sensitive data items into the one or more cryptography algorithms;

inputting, by the hierarchical deterministic (HD) crypto system, a resource-specific identifier into the one or more cryptography algorithms;

deriving a child public key and a child private key from the first private key in response to inputting the resource-specific identifier into the one or more cryptography algorithms, wherein the child private key is stored in an access control list (ACL) device;

generating an anonymous address from the child public key using a data-truncation technique;

retrieving an access code associated with a resource in response to deriving the child public;

encrypting the access code with the child public key;

publishing the anonymous address and the encrypted access code on a distributed ledger without exposing the one or more sensitive data items;

determining that the user device is within a defined proximity of the ACL device;

retrieving the child private key from the ACL device, wherein the ACL device is present at a spatial area associated with the resource;

decrypting the access code by the retrieved child private key;

retrieving the anonymous address from the user device entering the spatial area associated with the resource;

querying the distributed ledger using the retrieved anonymous address;

granting entry to the user device in the spatial area on determining the anonymous address of the user device is associated with the decrypted access code; and prohibiting the entry to the user device in the spatial area on determining the anonymous address of the user device is not associated with the decrypted access code.

* * * * *